(12) United States Patent
Todokoro

(10) Patent No.: US 6,722,869 B2
(45) Date of Patent: Apr. 20, 2004

(54) COTTON CANDY MAKING APPARATUS

(75) Inventor: Masatoshi Todokoro, Matsudo (JP)

(73) Assignee: Staff Co., Ltd., Tokyo (JP)

( * ) Notice: Subject to any disclaimer, the term of this patent is extended or adjusted under 35 U.S.C. 154(b) by 180 days.

(21) Appl. No.: 10/023,724

(22) Filed: Dec. 21, 2001

(65) Prior Publication Data

US 2002/0192319 A1 Dec. 19, 2002

(30) Foreign Application Priority Data

Jun. 13, 2001 (JP) ........................................ 2001-179149

(51) Int. Cl.[7] ................................................. A23G 3/00
(52) U.S. Cl. .......................... 425/9; 425/151; 425/162; 310/242; 200/566; 362/89
(58) Field of Search ..................... 310/242; 200/566; 425/9, 151, 162; 362/89

(56) References Cited

U.S. PATENT DOCUMENTS

| | | | | |
|---|---|---|---|---|
| 3,232,244 A | * | 2/1966 | Wallace et al. ................. | 425/9 |
| 3,973,097 A | * | 8/1976 | Rosenberg et al. ......... | 200/566 |
| 4,404,487 A | * | 9/1983 | Nimura ........................ | 310/239 |
| 4,793,782 A | * | 12/1988 | Sullivan ......................... | 425/7 |
| 4,842,502 A | * | 6/1989 | Tsumita et al. ................ | 425/9 |
| 4,846,643 A | * | 7/1989 | Yamamoto et al. ............ | 425/7 |
| 5,156,082 A | * | 10/1992 | Fukuda et al. ................ | 99/326 |
| 5,744,892 A | * | 4/1998 | Mukai et al. ................ | 310/251 |
| 5,766,643 A | * | 6/1998 | Hammon ........................ | 425/9 |

* cited by examiner

*Primary Examiner*—Robert Davis
*Assistant Examiner*—Joseph S. Del Sole
(74) *Attorney, Agent, or Firm*—Swidler Berlin Shereff Friedman, LLP

(57) ABSTRACT

In a cotton candy making apparatus with a removable tray, a main power supply switch and an auxiliary switch are provided. The main power supply switch is locked by being rotated in a predetermined direction while being depressed. Contacts of the auxiliary switch are closed when the tray is properly attached to a main body of the apparatus. Carbon or alloy brushes are used for brush devices for supplying electric current to a heater for a rotary pot, and the brushes are each biased in a slip ring direction with a spring in a brush holder. A cover for the rotary pot is provided which is constructed so as to be assembled to and disassembled from the rotary pot by rotating the same cover. A translucent tray and light emitting portions are provided on the main body of the apparatus for illuminating cotton candies within the tray.

6 Claims, 23 Drawing Sheets

COTTON CANDY MAKING APPARATUS

BACKGROUND OF THE INVENTION

1. Field of the Invention

The present invention relates to a cotton candy making apparatus.

2. Description of the Related Art

Most of household cotton candy making apparatus are currently marketed for use by children of younger ages and are designed to be operated by those children and their parents or other adults who take care of them together for making cotton candy. Since the apparatus can be operated relatively easily to make cotton candy that is actually edible, the children can enjoy playing with the apparatus much more than they play with toys such as those with which the children can simply play at housekeeping such as kitchen work or dining. When playing with the apparatus, the children can not only play by themselves but also enjoy a party together with their invited friends.

The cotton candy making apparatus is constructed as follows.

An apparatus main body comprises a cotton candy making portion and an electric circuit for controlling the cotton candy making portion, and an upper body is provided with a tray for receiving cotton candy made at the cotton candy making portion.

The cotton candy making portion comprises a rotary pot made of metal for making cotton candy, a heater with a thermal fuse for heating the rotary pot and a motor for driving the rotary pot. The electric circuit for controlling the cotton candy making portion comprises a driving circuit for the motor for driving the rotary pot, a temperature control circuit for the heater, a fuse for preventing the occurrence of accidents due to overheating of the heater and a main power supply switch for these circuits.

When used, a power supply plug at a distal end of a cord extending from the apparatus main body is inserted into a plug socket, and the power supply switch is turned on. Then, the rotary pot is heated by the heater and at the same time starts to turn at high speed. In this state, the rotary pot is pre-heated for a predetermined length of time so as to increase the temperature of the rotary pot and thereafter an amount of sugar which is required for making a single cotton candy is measured with a measuring spoon provided as an accessory and is introduced into the rotary port from an introduction port in an upper portion of the rotary pot. The sugar so introduced is heated in the interior of the rotary pot so as to be molten into something like syrup, and the molten syrup is discharged in the fiber-like form from slits formed in the circumferential wall of the rotary pot by virtue of centrifugal force generated when the rotary pot turns, whereby a cotton candy is made.

In case the tray fails to be attached to the apparatus when sugar is introduced into the rotary pot, there occurs a risk that the cotton candy so made is scattered around the cotton candy making apparatus, or that sugar which still remains hot touches the hands of the user, leading to the danger of the user getting burnt. Thus, care should be taken not to fail to attach the tray to the cotton candy making apparatus. After play, the rotary pot is caused to turn idly sufficiently, and the power supply switch should be turned off after it is confirmed that no more cotton candy is discharged from the rotary pot. Then, the plug is first pulled out of the plug socket for fear that the cotton candy making apparatus is mistakenly operated. Then, after the rotary pot and the rotary shaft are cooled down sufficiently covers and the tray need to be disassembled from the apparatus for cleaning, so that those constituent components can be kept clean.

In addition, the rotary pot of the cotton candy making mechanism is made of a metal, turns at high speed and is heated to a high temperature by the heater. In order to protect a child of a younger age who plays with the mechanism from getting burnt or injured by touching the hot rotary pot with his or her hand or hands or finger or fingers when the adult taking care of the infant user fails to watch him or her, a resin cover is disposed on the mechanism as a safety means. Additionally, this cover advantageously facilitates the introduction of sugar into the rotary pot.

However, the main power supply switch is a lock switch constituted by curved operation lever surfaces. For example, when an operation lever surface on a side where the contacts are opened is pressed with contacts being closed, the contacts are opened and the switch is locked with the contacts being opened. The switch is easy to be operated since the states of the contacts are shifted and locked by only pressing the operation lever surfaces. However, in case cleaning of the cotton candy making apparatus is started thoughtlessly by turning off the main power supply with the plug of the apparatus being kept inserted into the plug socket and thereafter part of the body of the child user or a thing happens to come into abutment with the main power supply switch, the metallic rotary pot is activated, leading to a risk that the user gets injured seriously.

Furthermore, the play is over and the main power supply switch is turned off after the rotary pot is caused to turn idly, so that the rotary pot is cooled down. Then, there occurs something that makes the adult watching the child user move from the playing area to leave alone the child user thereat with the plug of the apparatus still being kept inserted into the plug socket mistakenly. In these circumstances, if something falls on the switch or the child user gets interested to press the switch so that power is eventually supplied to the apparatus, the apparatus is activated, leading to a risk that the apparatus catches fire or the child user gets injured.

Moreover, the child user may start crying after he or she tries in vain to find the tray, and the guardian gets angry with the crying child and activates the cotton candy making apparatus without the tray being attached thereto. Then, cotton candy scatters around the apparatus and the playing room gets dirty. In addition, playing without the tray may allow the child user to get closer to the rotary pot at the face, and if this actually happens, hot sugar in the form of syrup adheres to the face skin of the child user, who eventually gets burnt seriously.

Furthermore, in case the tray is not properly attached to the cotton candy making apparatus, the tray may be detached from the apparatus while the apparatus is in operation. In case the tray so detached comes into contact with the rotary pot, the rotary pot is locked, and the fuse may be fused due to overcurrent. Alternatively, part of the tray gets melted by the rotary pot which is turning, and the resin so melted scatters around the apparatus, leading to a risk that the child user gets burnt seriously when the melted resin scatters to adhere to the exposed skin of the child user.

Additionally, the cotton candy making apparatus are made to produce beautifulness and loveliness that are liked by girls of younger ages by designed shapes and colors, and when girls get together to have a party where cotton candies are made they enjoy making tasty cotton candies with the lovely cotton candy making apparatus. However, the cotton candy making apparatus are not made to produce an advantage that friends who are looking at those who are actually making cotton candies are made to enjoy themselves at looking at their friends by designing cotton candies to glitter.

Furthermore, in case the motor or mechanism for turning the rotary pot of the cotton candy making apparatus fails and the rotary pot does not turn, children of younger ages cannot determine easily that power is supplied, and the heated heater becomes a danger to them. Additionally, in a case where the guardian is a bit apart from the children, it is considered that the guardian is late in recognizing that power is supplied if he or she cannot hear the operation noise of the rotary pot.

In addition, the cover secured with machine screws or nuts is removed when cleaning the covering net and the rotary pot, and therefore the machine screws or nuts have to be removed, and the machine screws or nuts so removed may be a danger to a baby if they are left in a room where the baby resides.

Furthermore, the covering net and the rotary pot are assembled back to the apparatus after they are dried sufficiently after they have been cleaned. Therefore, the machine screws or nuts for securing the cover have to be kept so that they are not lost until the covering net and the rotary pot are assembled back to the apparatus. Should they be lost, replacement parts have to be sent from the manufacturer, this taking lots of labor hours.

On top of the above, while it is superior in usage, the conventional cotton candy making apparatus have the following problems.

The driving portion of the aforesaid rotary pot is constructed as shown in FIG. 23, brushes 30 formed into plates are provided from left and right sides of slip rings 41 and 42. These brushes 30 are disposed in such a manner as to be pressed against the slip rings with a predetermined force. Namely, the brushes 30 formed into plates are disposed so as to be elastically deformed when they are mounted at predetermined positions and are biased to the slip ring side by making use of the spring characteristics of the material.

While copper having superior electric conductivity is used for the brushes, copper is not a material which is superior in spring characteristics and hence is easy to deform. Thus, since the brushes deform and are not restored to their original shapes in case an excessive force is applied to the brushes, care has to be taken so that there should be nothing which contacts the brushes strongly.

Due to this, the assembling work has to be done with care. When the brushes deform, there occurs a failure of the brushes to contact the slip springs and this generates sparks at contacts between the brushes and the slip springs, whereby the brushes and the slip springs wear or the contacts between the brushes and the slip rings are heated, causing a danger.

SUMMARY OF THE INVENTION

The present invention was made in view of the problems which are inherent in the aforesaid conventional technologies and an object thereof is to provide a cotton candy making apparatus in which the location of a main power supply switch is changed so that power cannot be supplied when the switch is touched mistakenly, and the construction of the main power supply switch is modified so that the switch cannot be activated when it is touched lightly, whereby the cotton candy making apparatus is made to be safe.

In addition, another object of the present invention is to provide a cotton candy making apparatus in which a safety switch mechanism is provided which is designed to prohibit the supply of power unless a tray for receiving cotton candies is properly and completely mounted, thereby preventing an accident which would be caused by an erroneous usage.

Additionally, a further object of the present invention is to provide a cotton candy making apparatus in which light emitting portions are provided in a main body of the apparatus for illuminating a cotton candy made within a tray formed from a translucent resin so as to produce advantages that the cotton candy so made within the tray can look tasty and that it can be determined with ease that power is being supplied.

Furthermore, another object of the present invention is to provide a cotton candy making apparatus in which members such as machine screws or nuts are not used to secure a cover which has to be disassembled and assembled before and after the interior of a rotary pot is cleaned, respectively.

Moreover, a further object of the present invention is to provide a cotton candy making apparatus in which brush devices of a heater for heating the rotary pot are improved so that there is generated no spark between contacts between brushes and slip rings which spark would otherwise wear the brushes and the slip rings and heat the contacts between the brushes and the slip rings.

According to a first aspect of the present invention, there is provided a cotton candy making apparatus comprising a tray that can freely be assembled to and disassembled from a main body, the cotton candy making apparatus being characterized in that a main power supply switch adapted to be locked by being rotated in a predetermined direction while being depressed is disposed at an upper portion of the main body.

According to the first aspect of the present invention, the main power supply switch comprising a mechanism in which contacts are not closed in a state in which an operating portion of the switch is depressed but are closed and locked by rotating the operating portion in the predetermined direction while the operating portion is being depressed is disposed at the upper portion of the main body of the apparatus. For example, even in case the guardian has turned off the main power supply switch but has failed to pull out the plug from the plug socket after children have played with the cotton candy making apparatus to make cotton candies and the operating portion of the main power supply switch is struck with a thing or depressed, the contacts are not closed and hence the cotton candy making apparatus is activated in no case. In addition, since it is difficult for children of younger ages to sequentially perform the two operations or rotate the operating portion while depressing the same portion, the children can be persuaded that cotton candies can be made only when the guardian accompanies them.

According to a second aspect of the present invention, there is provided a cotton candy making apparatus as set forth in the first aspect of the invention, wherein an auxiliary switch mechanism in which contacts are closed by properly attaching the tray to the main body is provided on the main body, whereby power is designed not to be supplied by a main power supply switch unless the contacts of the auxiliary switch mechanism are closed.

According to the second aspect of the invention, the auxiliary switch mechanism is disposed which does not allow the supply of power by the main power supply switch unless the tray is properly attached to the main body of the apparatus. For example, since no power is supplied to the apparatus even if the main power supply switch is depressed in case the tray is not attached to the apparatus or is attached thereto in an improper fashion, it is possible to prevent the occurrence of an accident that a child gets injured when his or her hand or face touches the rotary pot which is made of a metal and rotates at high speed or that the tray comes off while in operation.

According to a third aspect of the present invention, there is provided a cotton candy making apparatus as set forth in the first or second aspect of the invention, comprising a translucent tray which is provided on the main body, wherein a light emitting portion is provided in the main body of the apparatus for illuminating a cotton candy made in the interior of the tray.

According to the third aspect of the present invention, the cotton candy making apparatus has the translucent tray provided on the main body, and the light emitting portion is provided on the apparatus main body for illuminating a cotton candy made in the interior of the translucent tray. For example, a cotton candy in the tray made from a resin having high translucency or the like is made to glitter like a jewel by illuminating the cotton candy in the tray with light, whereby an advantage is produced that the cotton candy so illuminated looks tasty.

Furthermore, a further advantage can be produced that the cotton candy looks more tasty by emitting from the light emitting portion red light representing the color of strawberry or yellowish green light representing melon. In addition, while the temperature of the rotary pot has to be adjusted with a temperature adjusting lever depending on the outside temperature and the humidity of a place where the apparatus is used, the adjustment of temperature can be described clearly understandingly by disposing a temperature sensor in the vicinity of the rotary pot while providing a circuit for changing the color of the light from the light emitting portion depending on the temperature of the rotary pot in the vicinity of the rotary pot and giving in the owner's manual or the like a statement, "in case the light does not become red accordingly, please adjust the temperature adjusting lever so that the color of the light becomes red."

According to a fourth aspect of the present invention, there is provided a cotton candy making apparatus as set forth in the third aspect of the invention, wherein the light emitting portion is constituted by a plurality of light emitting diodes disposed on a portion of the main body which is situated below the translucent tray attached to the main body.

According to the fourth aspect of the invention, the light emitting portion is constituted by the plurality of light emitting diodes disposed on the portion of the main body which is situated below the translucent tray attached to the main body, and a cotton candy is illuminated from below the tray. For example, it is safe even if the light emitting portion is disposed at a position where children of younger ages can touch the light emitting portion with the hand by using for the light emitting portion a light emitting diode which is illuminated at a low voltage but is not heated, and there is also caused no concern that a cotton candy made gets warmed with the light. In addition, light emitting diodes have strong resistance to vibrations due to its construction, and no maintenance work is required such as replacing bulbs. Moreover, since light emitting diodes are easy to be colored, various colors can be set with ease.

According to a fifth aspect of the present invention, there is provided a cotton candy making apparatus as set forth in the third or fourth aspect of the invention, wherein the light emitting portion is adapted to flash.

According to the fifth aspect of the present invention, the light emitting portion flashes. For example, the cotton candy making process can be implemented enjoyably to a certain rhythm by designing the light emitting portion to flash to a predetermined tempo or sounds. In addition, the player can enjoy following the light from the light emitting portion while turning a stick to make a cotton candy therearound by designing the plurality of diodes at the light emitting portion to flash sequentially in a flowing fashion, this allowing even boys to enjoy making cotton candies.

According to a sixth aspect of the present invention, there is provided a cotton candy making apparatus as set forth in any of the first to fifth aspects of the invention, wherein a threaded portion is provided on a cover for the rotary pot which is adapted to be connected to a shaft, whereby the cover can be assembled to and disassembled from the rotary pot by being rotated in predetermined directions.

According to the sixth aspect of the present invention, the nut portion adapted to be connected to the shaft is provided on the cover for the rotary pot of the cotton candy making apparatus, and the cover is designed to be assembled to and disassembled from the rotary pot by turning the cover in the predetermined directions, whereby the cover can easily be disassembled from and assembled back to the rotary pot without using a specific tool when the cover is required to be disassembled from and assembled back to the apparatus when cleaning is required. In addition, since the construction is adopted in which the nut portion is provided on the cover, no small machine screws or nuts are used to secure the cover, and therefore there is caused no risk that the screws or nuts are lost. Furthermore, since fewer labor hours are required for cleaning, frequent cleaning would be no trouble, whereby the cotton candy making apparatus can be kept clean at all times and the guardian can feel safe while allowing children to play with the apparatus.

According to a seventh aspect of the present invention, there is provided a cotton candy making apparatus comprising a tray adapted to be assembled to and disassembled from a main body as set forth in any of the first to sixth aspects of the invention, wherein carbon brushes which are each biased in a slip ring direction with a spring within a brush holder are provided as brush devices for supplying electric current to a heater of the rotary pot.

According to the seventh aspect of the present invention, the carbon brushes which are each biased in the slip ring direction with the spring within the brush holder are provided as the brush devices for supplying electric current to the heater of the rotary pot, whereby the brushes can be made to contact the slip rings with a constant force by making use of the biasing force of the springs. This provides the cotton candy making apparatus in which no spark is generated between the contacts between the brushes and the slip rings which spark would otherwise wear the brushes and the slip rings and heat the contacts therebetween.

According to an eighth aspect of the present invention, there is provided a cotton candy making apparatus as set forth in the seventh aspect of the invention, wherein alloy brushes are provided as the brush devices which are each biased in the slip ring direction with the spring within the brush holder.

According to the eighth aspect of the present invention, there is provided the cotton candy making apparatus in which no spark is generated between the contacts between the brushes and the slip rings which spark would otherwise wear the brushes and the slip rings and heat the contacts therebetween by adopting the alloy brushes for the brush devices.

Thus, there is provided a cotton candy making apparatus which is safe and free from a risk of calling for an accident or a fire through a construction in which the main power supply switch constructed such that the contacts are not closed only by being depressed but are closed by being turned in the predetermined direction while being depressed is disposed on an upper surface of the main body of the apparatus, so that the main power supply switch is not switched on even if the switch is touched carelessly until the switch is turned in the predetermined direction.

In addition, there is provided a cotton candy making apparatus which can reduce the risk of an accident such as a fire being called for due to carelessness through a construction in which the auxiliary switch adapted to be activated by attaching the tray to the main body of the apparatus is provided on the main body so that power is not supplied to the apparatus until the auxiliary switch is closed even if the main power supply switch is closed.

Furthermore, there is provided a cotton candy making apparatus wherein the light emitting portion is provided on the main body of the apparatus for illuminating a cotton candy made in the interior of the tray, and wherein the light emitting portion is constituted by the plurality of light emitting diodes which are disposed on the portion of the main body situated below the translucent tray attached to the main body, whereby the cotton candy can be illuminated from below the tray so as to produce the advantage that the cotton candy looks tasty.

Moreover, there is provided a cotton candy making apparatus wherein the cover for the rotary pot can be easily assembled to or disassembled from the rotary pot without using the machine screws or nuts but by being rotated when the rotary pot and the like are cleaned after the cotton candy making apparatus has been used. There is provided a cotton candy making apparatus wherein the cover portion of the rotary pot comprises an upper cover member having at the center thereof an embedded nut portion provided with a looseness preventing portion adapted to be fastened to a distal threaded portion of the shaft of the rotary pot, a cylindrical cover member for surrounding the periphery of the rotary pot and a cover net guide portion which clamps a cover net for preventing the mixture of foreign matters into the rotary pot, wherein the cylindrical cover is assembled in such a manner as to be clamped by the upper cover member and the cover net guide portion so that heat from the rotary pot is made difficult to be conducted and can be assembled and disassembled by turning the cover in the predetermined directions, thereby facilitating the cleaning of the rotary pot.

Furthermore, the carbon brushes which are each biased in the slip ring direction with the spring within the brush holder are provided as the brush devices for supplying electric current to the heater of the rotary pot, whereby the brushes are allowed to contact the slip rings with the constant force.

This provides a cotton candy making apparatus in which there is generated no spark between the contacts between the brushes and the slip rings which spark would otherwise wear the brushes and the slip rings and heat the contacts therebetween.

DETAILED DESCRIPTION OF THE PREFERRED EMBODIMENT

An embodiment of the present invention will be described in detail below with reference to the appended drawings.

Figure 1:
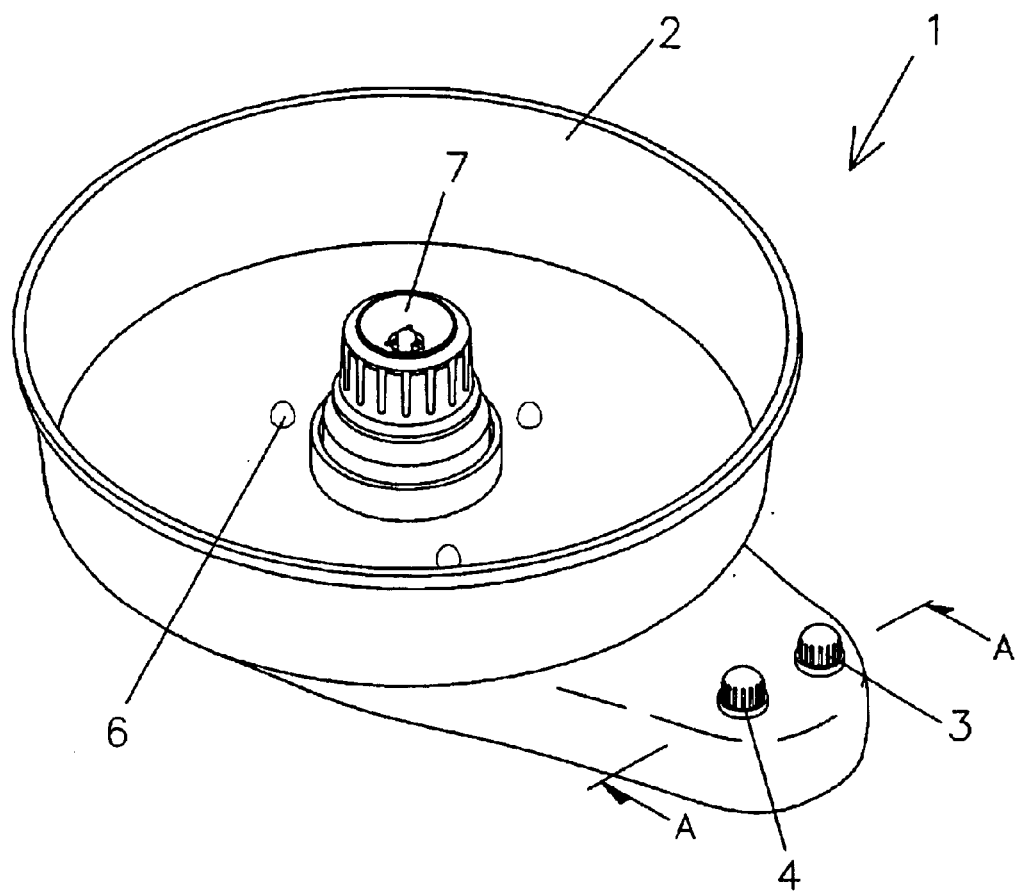
FIG. 1 is a perspective view showing an external appearance of a cotton candy making apparatus according to the present invention.

FIG. 1 shows the external appearance of a cotton candy making apparatus according to the present invention. A main body 1 of the cotton candy making apparatus comprises a cotton candy making portion (not shown) and an electric circuit (not shown) for controlling the cotton candy making portion. Provided on an upper portion of the main body 1 are a removable tray 2 made from a resin having high translucency for receiving a cotton candy made with the apparatus, a main power supply switch 3 for switching on and off a main power supply for the apparatus and a temperature adjusting switch 4 for adjusting the temperature of a fuse for melting sugar which is an original material of a cotton candy to be made into a syrup-like condition. A cover 7 for a rotary pot is provided at a central portion of the main body 1. Light emitting portions 6 adapted to be normally illuminated or flash are provided in the interior of the tray 2.

In addition, while not shown, the cotton candy making portion comprises a metallic rotary pot for making cotton candies, a heater with a temperature fuse for heating the rotary pot, a heating table on which brush devices for supplying electric current to the heater and slip rings are disposed and a motor for driving the rotary pot, whereas the electric circuit for controlling the cotton candy making portion comprises a driving circuit for the motor for driving the rotary pot, a temperature control circuit for the heater and a temperature fuse for preventing the occurrence of an accident due to the overheating of the heater.

Firstly, the construction of the power supply switch according to the present invention will be described.

Figure 2:
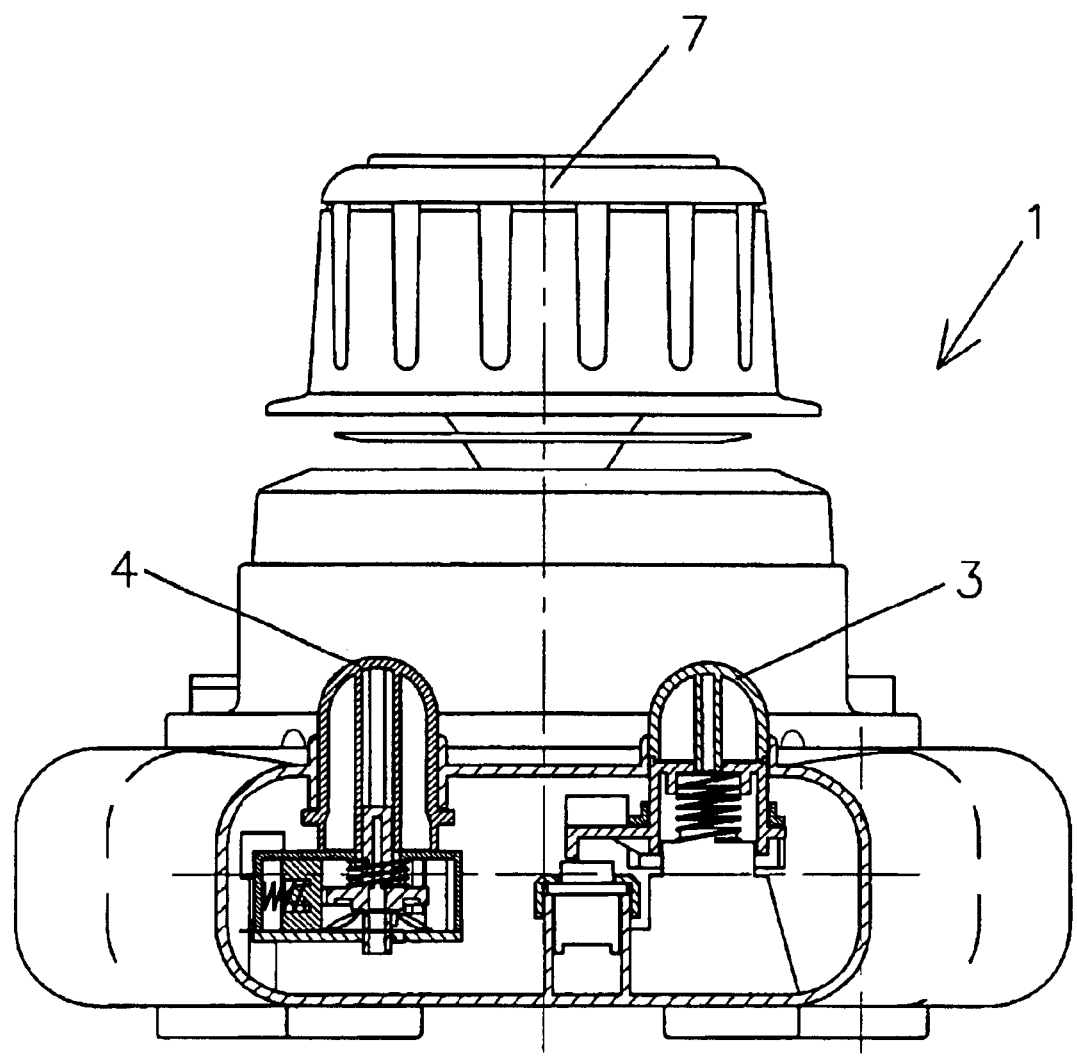
FIG. 2 is a partially sectional view taken along the line A—A of FIG. 1.
Figure 3:
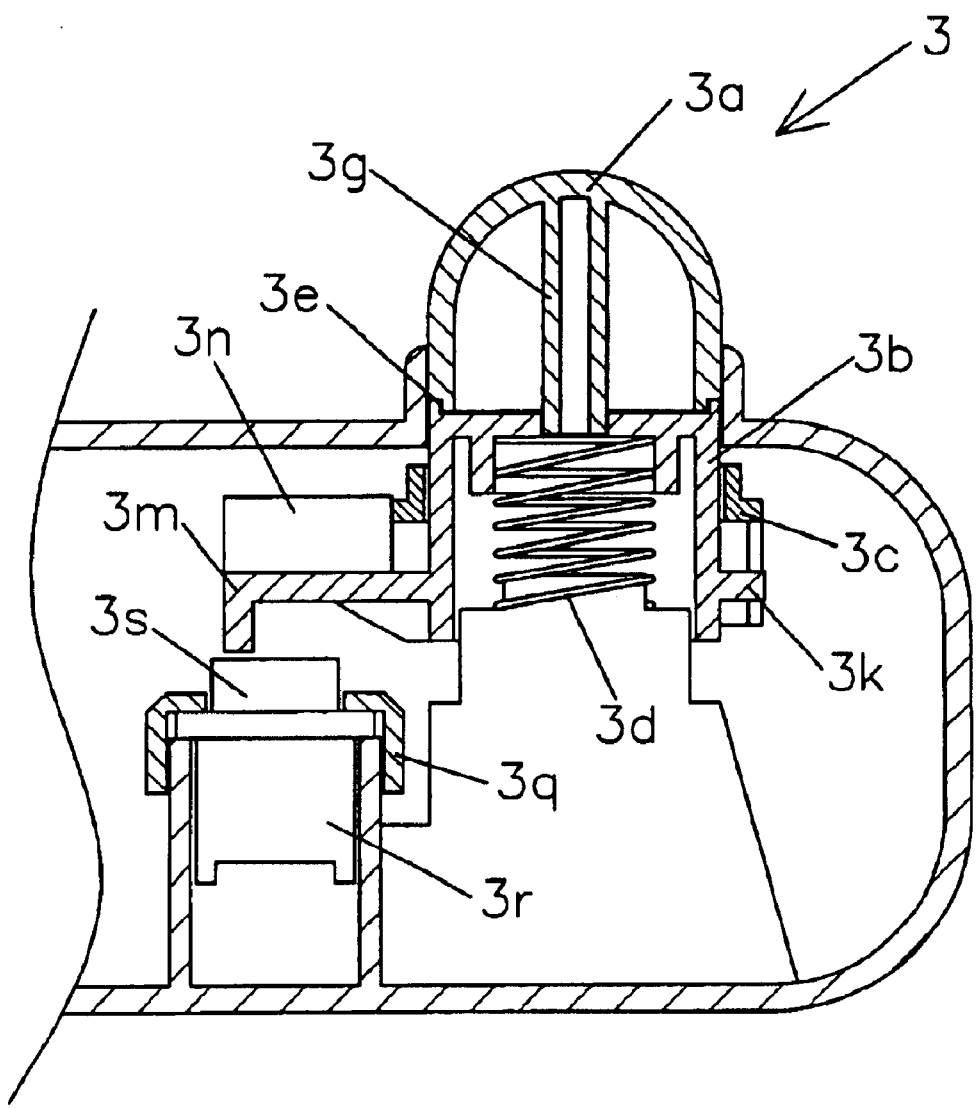
FIG. 3 is an enlarged sectional view showing a main power supply switch portion shown in FIG. 2.
Figure 4:
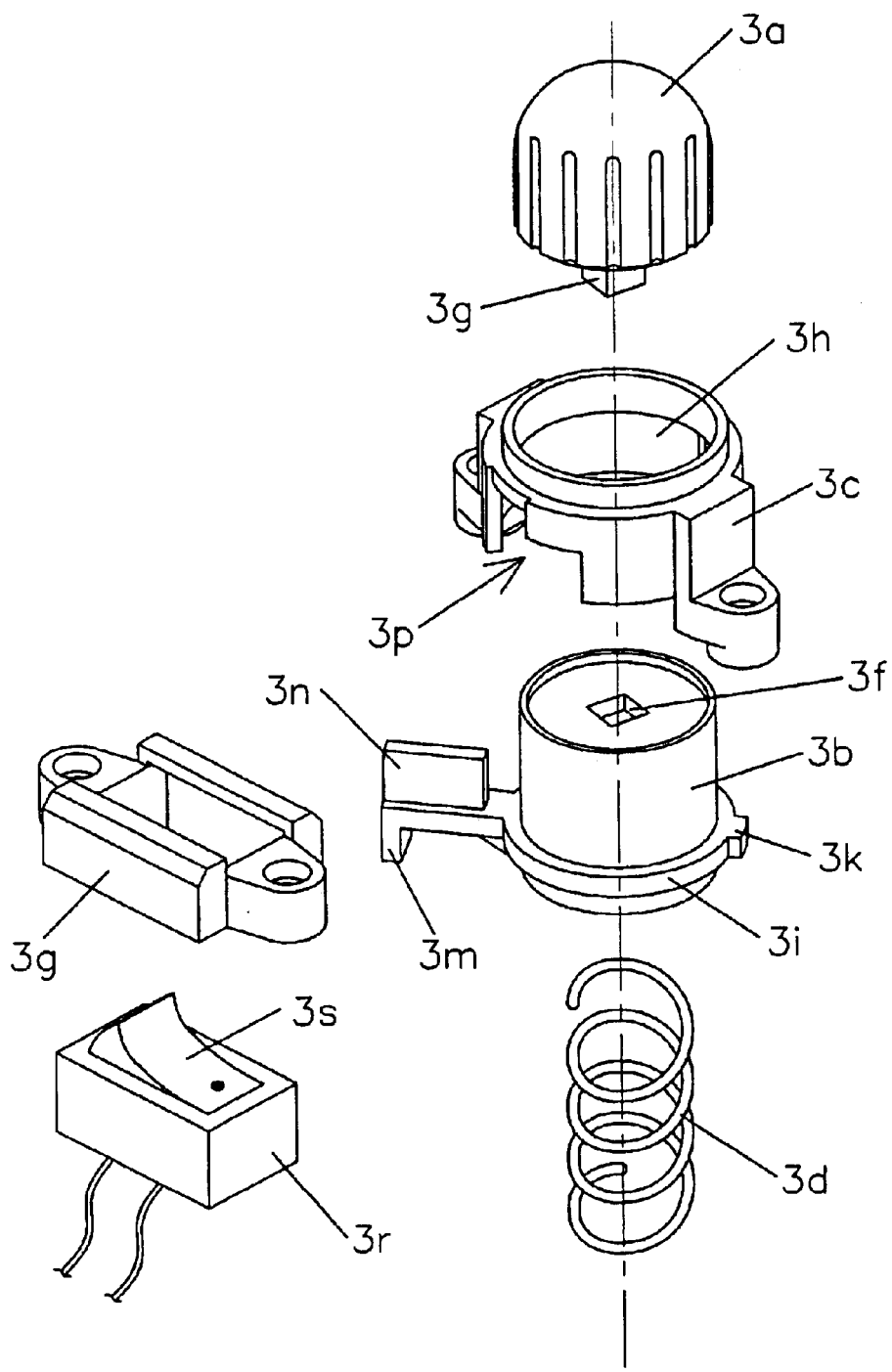
FIG. 4 is an exploded perspective view showing the construction of the main power supply switch.

FIG. 2 shows a section taken along the line A—A in FIG. 1, FIG. 3 is an enlarged sectional view of the main power supply switch, and FIG. 4 is an exploded view of the main power supply switch.

Note that FIGS. 2 to 4 shows members only that are needed for explaining the construction of the main power supply switch with members which are not essential to the explanation being omitted.

As shown in FIGS. 2 to 4, the main power supply switch 3 is constituted by a tab 3*a*, a rotating member 3*b*, a pedestal 3*c* and a spring 3*d*, and the respective members are attached as below.

Namely, in order to allow the tab 3*a* and the rotating member 3*b* to rotate together, a lower portion of the tab is press fitted in an upper portion of the rotating member 3*b*, and the tab 3*a* and the rotating member 3*b* are then coupled together via an engagement portion 3*e*. As this occurs, an angular shaft 3*g* provided in the interior of the tab 3*a* is fittingly inserted into an opening 3*f* formed in an upper bottom of the rotating member 3*b*, so that the tab 3*a* is prevented from rotating idly at the joint portion between the tab 3*a* and the rotating member 3*b* even if the tab is twisted strongly when it is used.

The rotating member 3*b* that is coupled to the tab 3*a* is passed through an opening 3*h* in the pedestal 3*c* from below to be disposed such that an engagement portion 3*i* provided at a lower portion of the rotating member 3*b* and a stepped portion 3*j* on the pedestal 3*c* are brought into loose engagement with each other. At the same time, the rotating member 3*b* is biased upwardly with the spring 3*d*.

Three projections 3*k*, 3*m*, 3*n* are provided on the rotating member 3*b* and the respective projections function as follows.

Namely, the projection 3*k* is guided into a vertically elongate guide groove (not shown) formed in the pedestal 3*c*, so that the projection 3*k* is allowed to move in vertical directions but is not allowed to move in horizontal directions, whereby in case a force is applied mistakenly to the main power supply switch in a direction in which the main power supply switch is twisted, the projection is brought into engagement with the groove to prevent the operation of the switch. On the contrary, in case the switch is properly operated such that the switch is twisted after it has been depressed, the projection 3*k* moves downwardly in the guide groove to pass through the groove, whereby the switch is allowed to rotate within a predetermined range so that the switch can be twisted.

The projection 3*n* is adapted to be brought into engagement with a notched portion 3*p* formed in the pedestal 3*c* when the switch is operated, so that the depressed state of the switch 3*r* can be maintained. Thus, the projection 3*n* is designed to hold the switch.

The projection 3*m* is designed to depress an actuator portion 3*s* of the switch 3*r* which is fixed to a fixing member 3*q* when the switch is operated.

Figure 5:
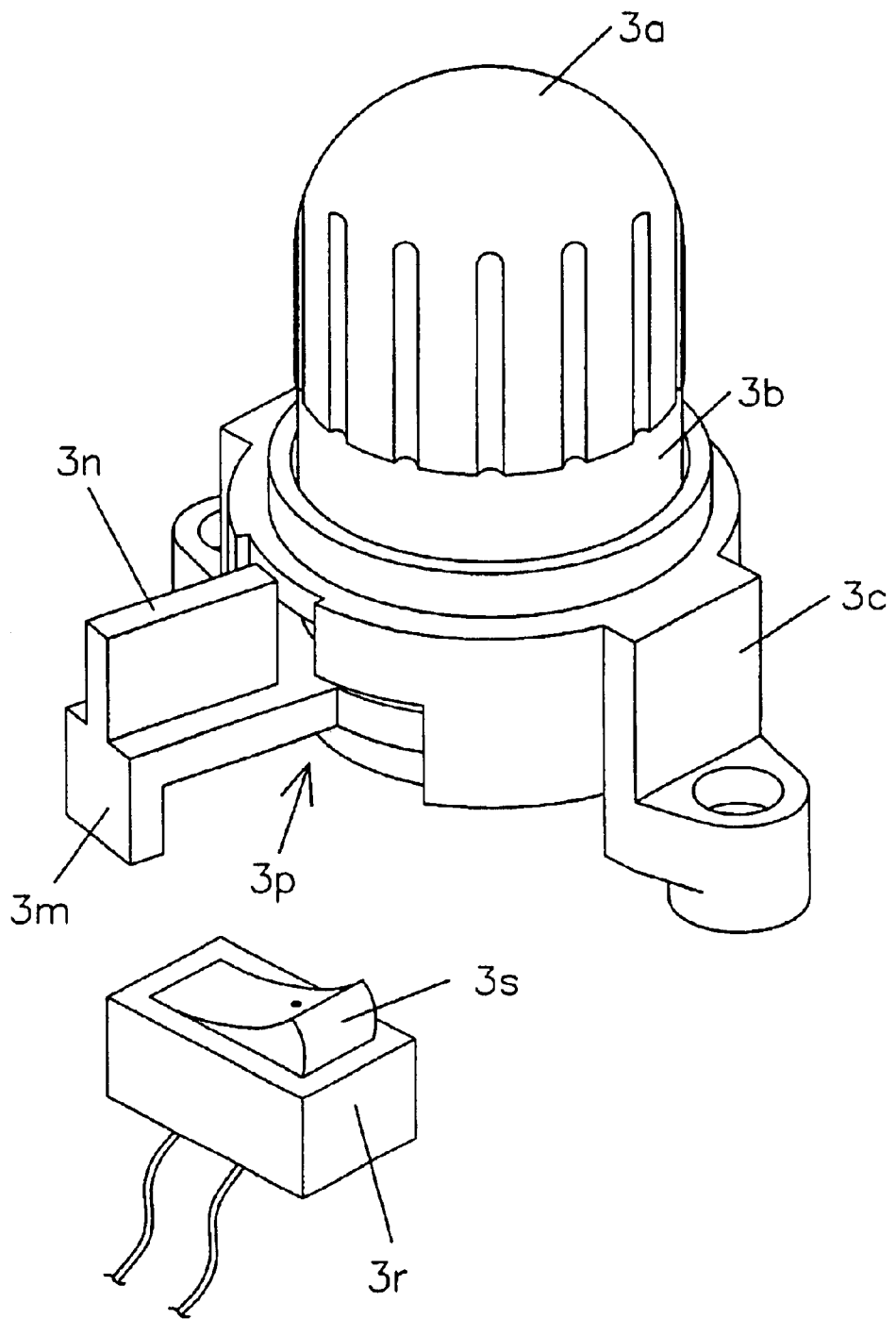
FIG. 5 shows a first state of the main power supply switch and a positional relationship thereof.
Figure 6:
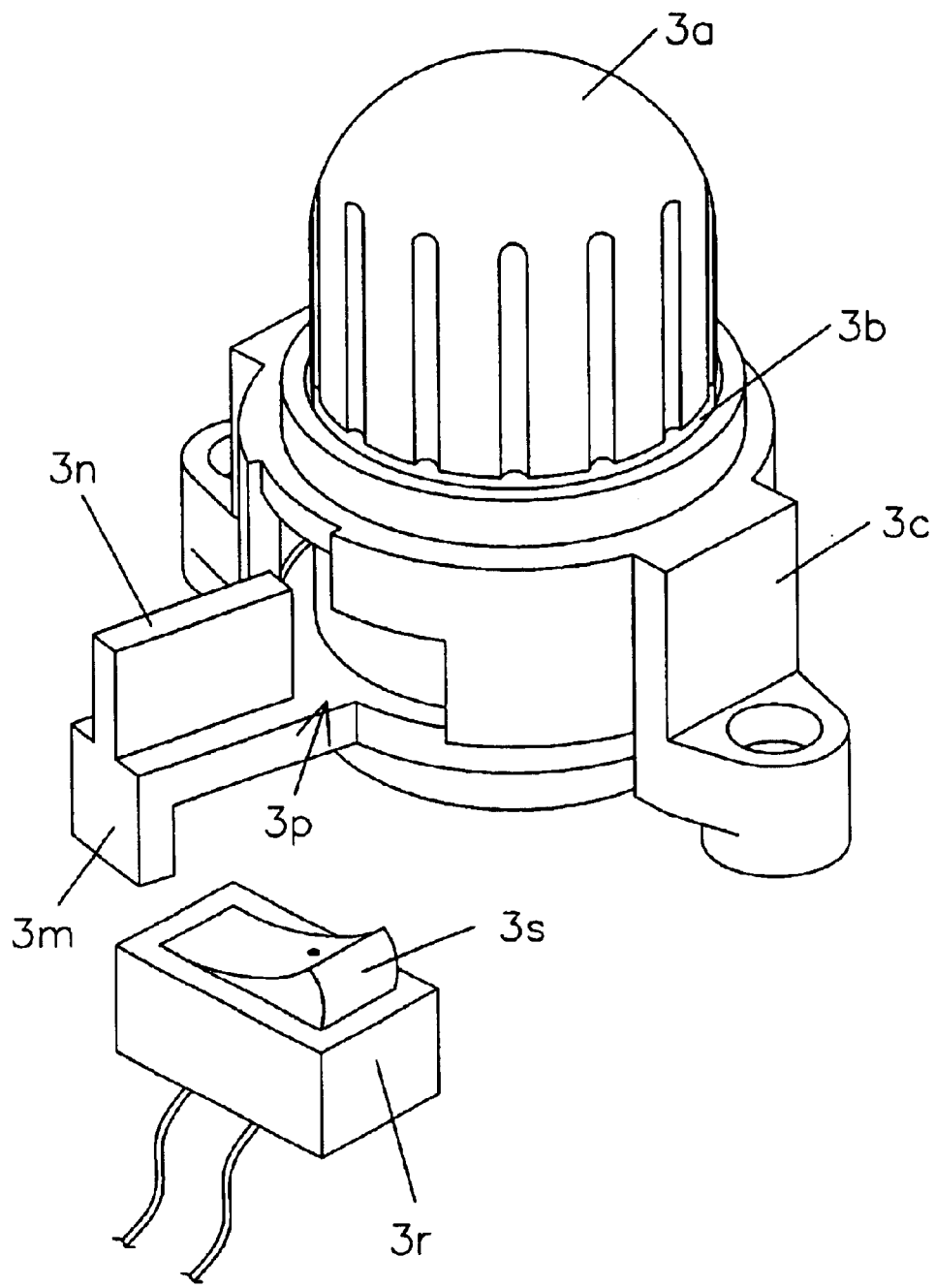
FIG. 6 shows a second state of the main power supply switch and a positional relationship thereof.
Figure 7:
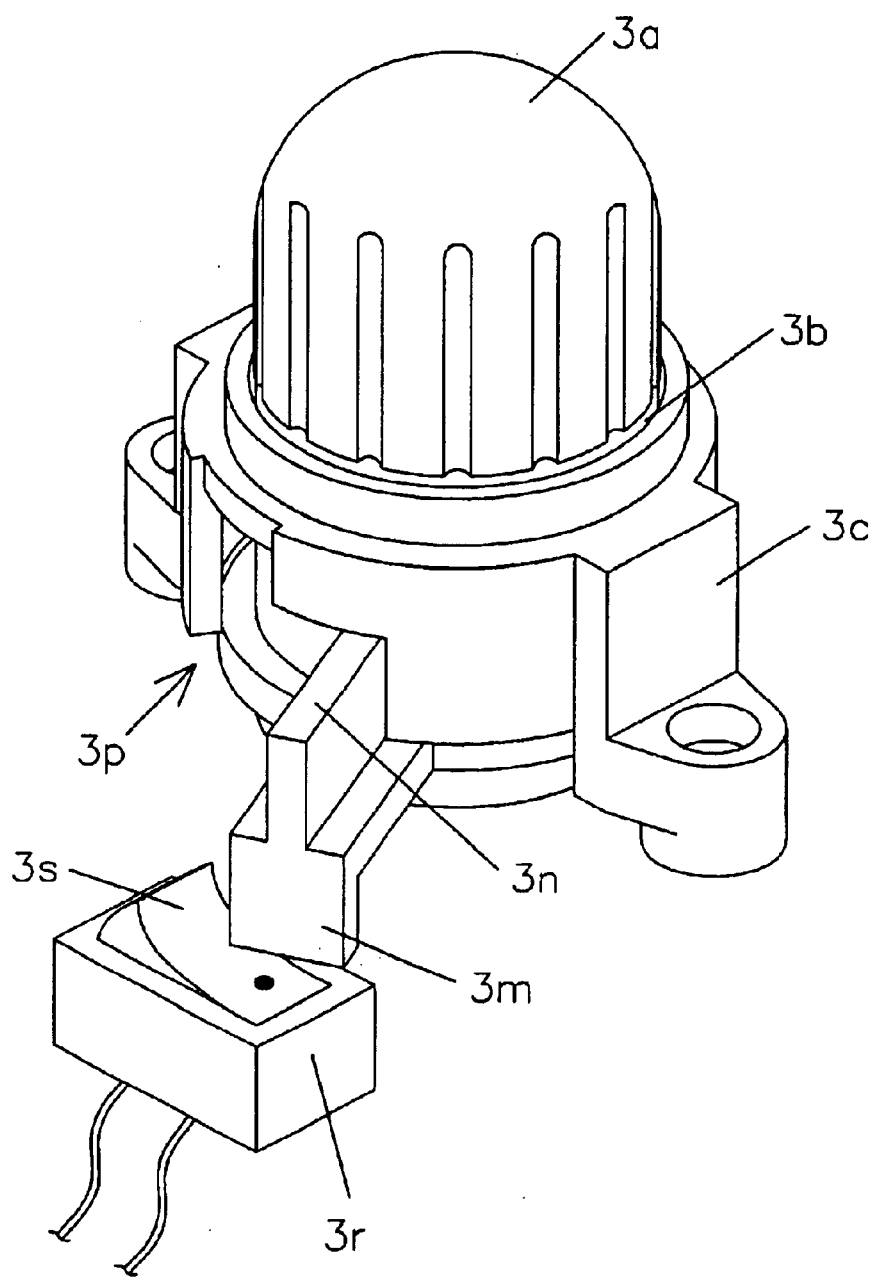
FIG. 7 shows a third state of the main power supply switch and a positional relationship thereof.

FIGS. 5 to 7 shows respective states of the switch portion, wherein FIG. 5 shows a stand-by state or a state in which contacts of the switch are open. FIG. 6 shows a state in which the tab 3*a* of an operating tab portion of the switch is depressed downwardly, and FIG. 7 shows a state in which the tab 3*a* is rotated in a clockwise direction while being depressed so as to reverse the state of the actuator 3*s* of the switch 3*r* to close the contacts with the projection 3*n* being brought into abutment with a side of the notched portion.

Thus, disposing the switch at the upper portion of the main body can reduce the risk that the switch is mistakenly operated when compared with a case where the switch is disposed at a side portion of the main body. In addition, the main power supply switch 3 is constructed such that the contacts are not opened and locked thereat unless the main power supply switch 3 is rotated in the clockwise direction while being depressed. Namely, since the main power supply switch according to the present invention is never put in operation nor locked until the main power supply switch is rotated after it has been depressed once, the main power supply switch does not operate mistakenly only by being touched slightly, thereby making it possible to reduce the risk that an accident or a fire is called for due to the operation of the apparatus which is not intended but is activated by the careless operation of the switch.

Figure 8:
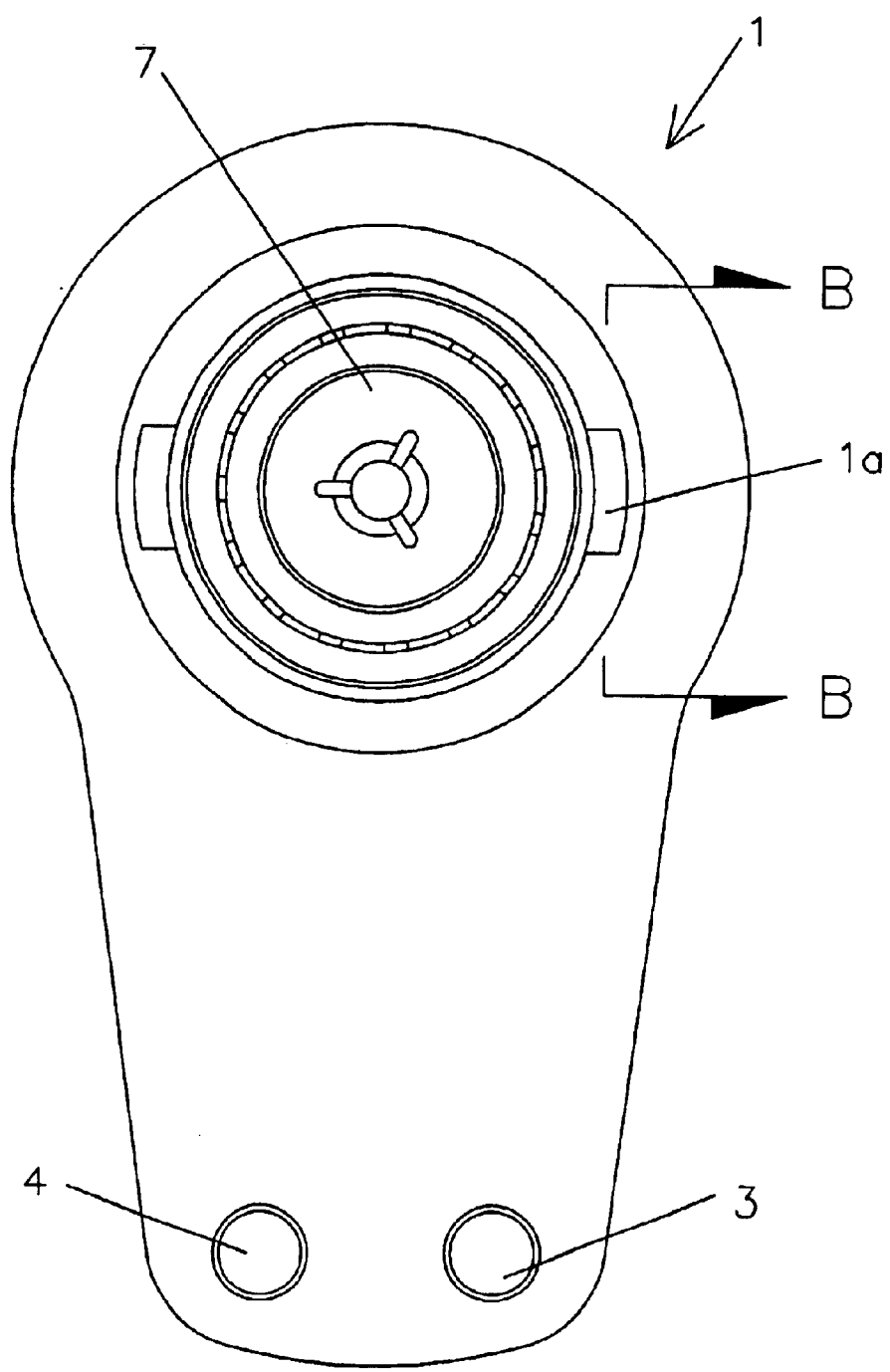
FIG. 8 is a plan view showing a state in which a tray is removed from the cotton candy making apparatus shown in FIG. 1.
Figure 9:
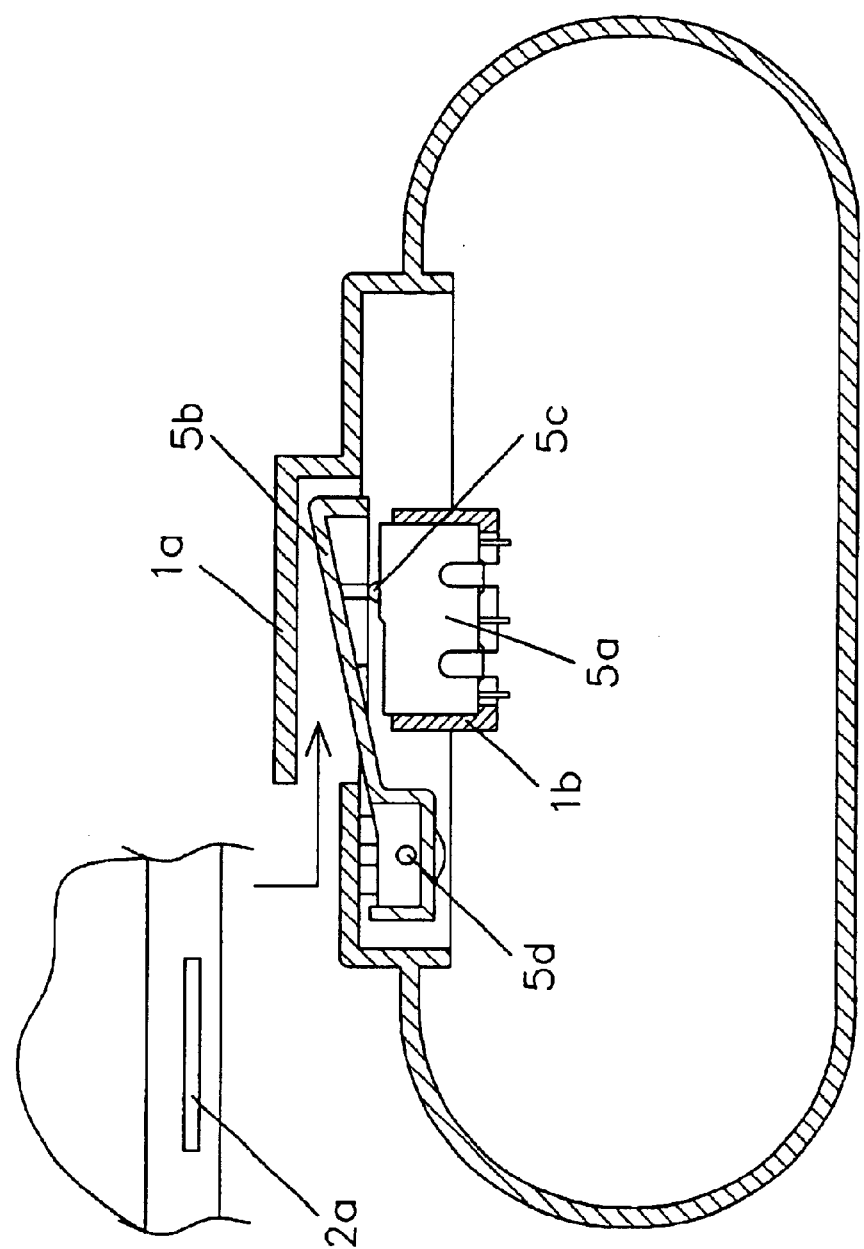
FIG. 9 is a sectional view taken along the line B—B in FIG. 8.

Next, an auxiliary switch mechanism will be described which is designed to be activated by attaching the tray to the main body. FIG. 8 is a plan view showing a state in which the tray 2 is removed from the cotton candy making apparatus shown in FIG. 1, and FIG. 9 is a sectional view taken along the line B—B in FIG. 2. In both the figures, only members required for the explanation are shown, and members which are not essential to the explanation are omitted.

An auxiliary switch 5 according to the present invention is disposed below a locking portion 1*a*. The auxiliary switch 5 comprises a micro switch 5*a* disposed at a holding portion 1*b* and a movable plate 5*b*. The movable plate 5*b* is a member for depressing an actuator portion 5*c* of the micro switch 5*a* and is rotatably supported on a shaft 5*d* at one end thereof.

According to this construction, when the tray is attached to the main body, a locking portion 2*a* provided on the tray side is brought into engagement with the locking portion 1*a* on the main body side, and as this occurs, the movable plate 5*b* is forced to move downwardly, whereby the auxiliary switch 5 is activated.

The present invention is constructed as has been described heretofore, and since power is not supplied to the apparatus unless the auxiliary switch is in operation even in case the main power supply switch is activated mistakenly, the present invention can enhance the advantage that the occurrence of an accident due to the wrong playing procedure is prevented more effectively when compared with the conventional cotton candy making toy which is activated only by operating the main power supply switch.

Next, a mechanism will be described for illuminating a cotton candy being produced within the tray 2.

As shown in FIG. 1, the light emitting diodes 6 disposed on the main body 1 are intended to illuminate a cotton candy being made through the resin having high translucency.

Figure 10:
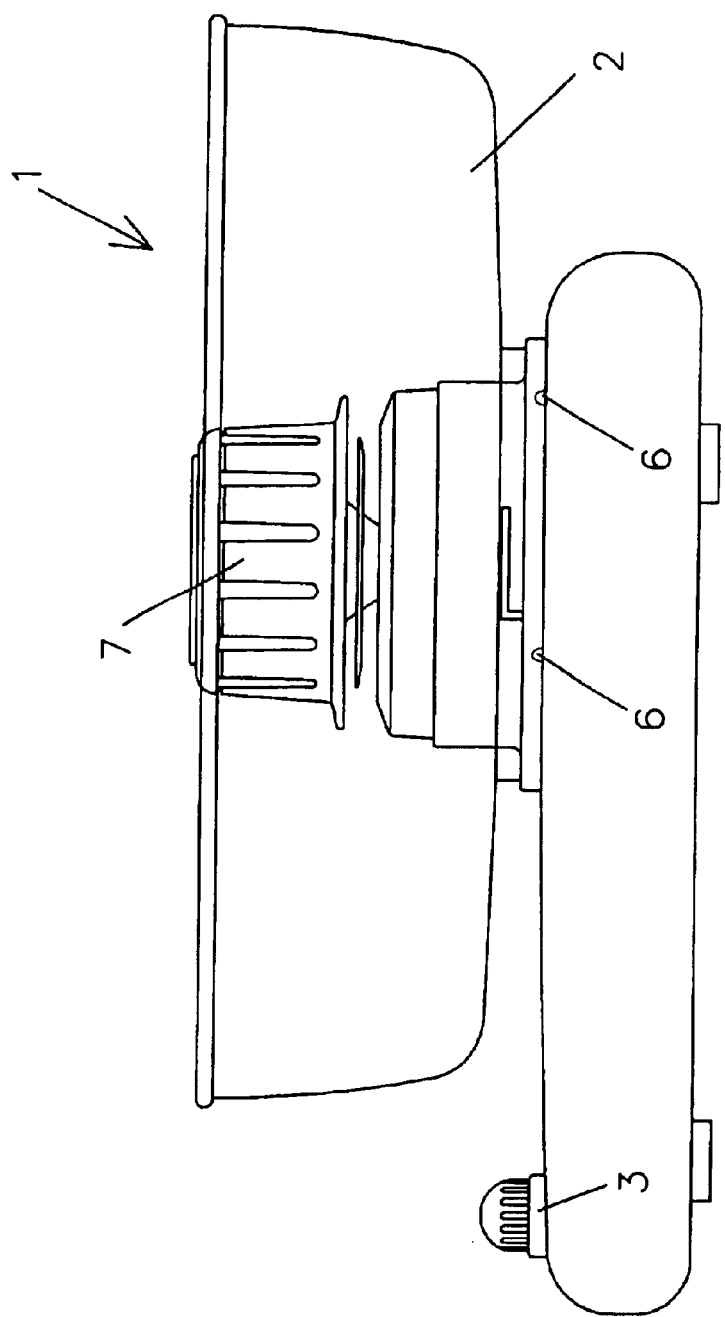
FIG. 10 is a side view of the cotton candy making apparatus according to the present invention.

FIG. 10 is a side view of the cotton candy making apparatus shown in FIG. 1, and as shown therein, the light emitting diodes 6 are disposed on the main body in such a manner as to illuminate a lower portion of the tray 2 from the main body side.

Figure 11:
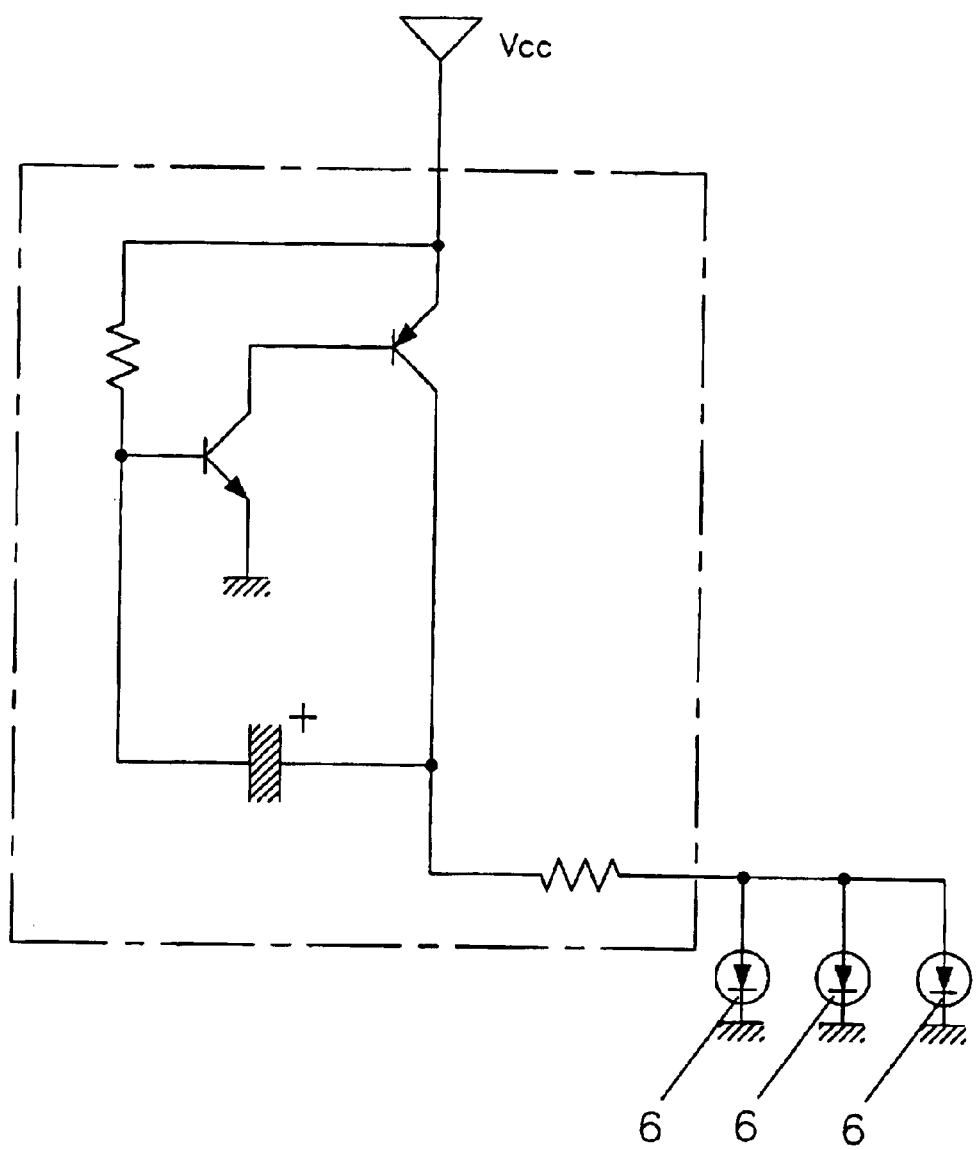
FIG. 11 is a circuit diagram showing an illumination circuit for a light emitting portion.

FIG. 11 is a circuit diagram showing an example of a general oscillation circuit for flashing the light emitting diodes 6.

The present invention is constructed as has been described above and functions as follows when used.

Figure 12:
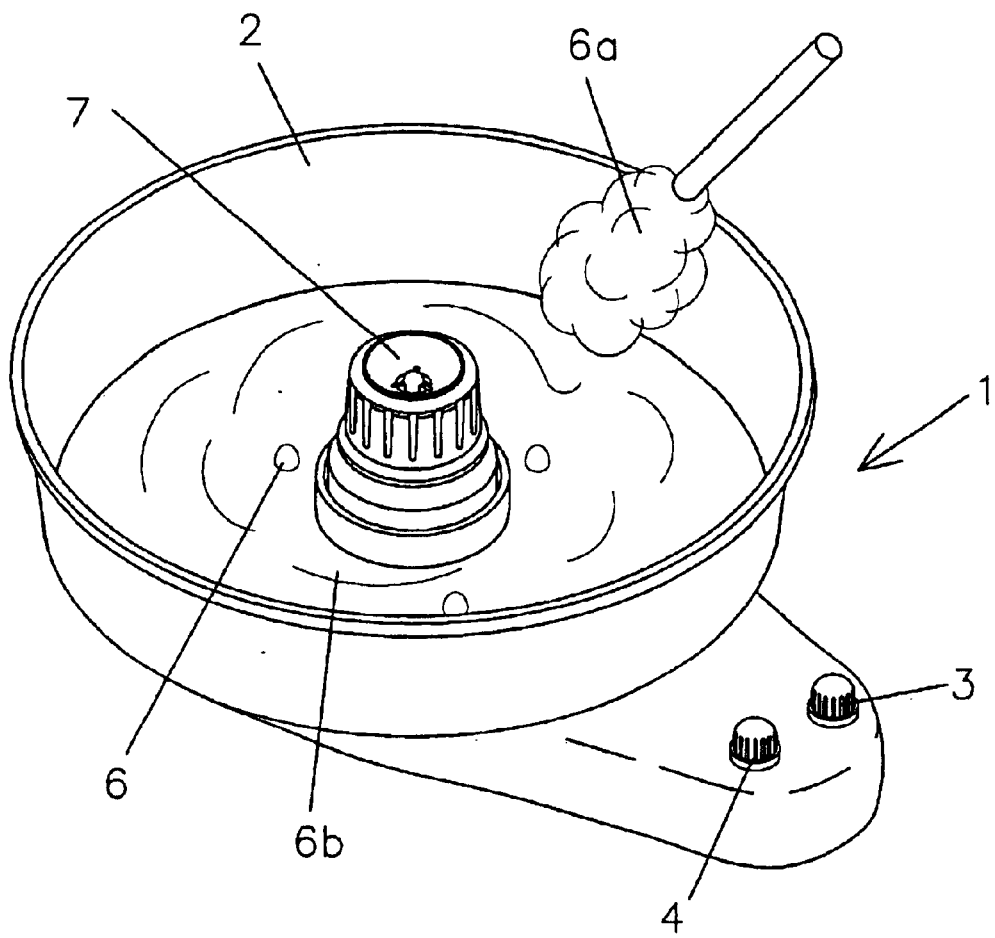
FIG. 12 is a diagram showing a state in which the cotton candy making apparatus according to the present invention is used.

FIG. 12 shows a state in which the cotton candy making apparatus according to the present invention is in use. A cotton candy 6b being made within the tray 2 formed from the resin having high translucency and a cotton candy 6a taken up around a stick are illuminated by colorful light from the light emitting portions 6, whereby little girls are pleased to see the beautiful cotton candies and enjoy making them.

Furthermore, by changing the color of light from the light emitting portions and designing the light emitting portions to flash in a sequential manner so that light from the light emitting portions look as if it were flowing, little boys who tend to be interested in moving things become interested in the light which changes its color and the direction in which the light flows, thus the cotton candy making apparatus of the present invention providing a great advantage as a mood producing apparatus to enhance the atmosphere at a party where lots of people gather.

Note that while the light emitting diodes are described as being used at the light emitting portions in the aforesaid embodiment, the present invention is not limited thereto but may be constructed so as to allow the use of any other light emitting means such as bulbs, neon tubes and cold-cathode tubes.

In addition, while the light emitting portions are described as being illuminated simultaneously in the aforesaid embodiment, the present invention is not limited thereto but may be constructed so that the light emitting portions are normally illuminated, flash in an alternate fashion or flash randomly.

Next, a mechanism will be described which allows the cover 7 of the rotary pot to be disassembled from and assembled to the rotary port with ease without using machine screws or nuts but only by rotating the cover when the cover has to be disassembled from and assembled back to the rotary port for cleaning after the cotton candy making apparatus has been used.

As shown in FIG. 1, the cover 7 of the rotary pot disposed at the central portion of the main body 1 can be removed easily from the threaded portion of the shaft by turning the cover in the predetermined direction, thereby making it possible to reduce labor hours needed to operate the disassembling and assembling work before and after the rotary pot is cleaned. In addition, since machine screws or nuts are not used, it is possible to educate children to make it practice to clean the apparatus after play which they would otherwise feel troublesome.

Figure 13:
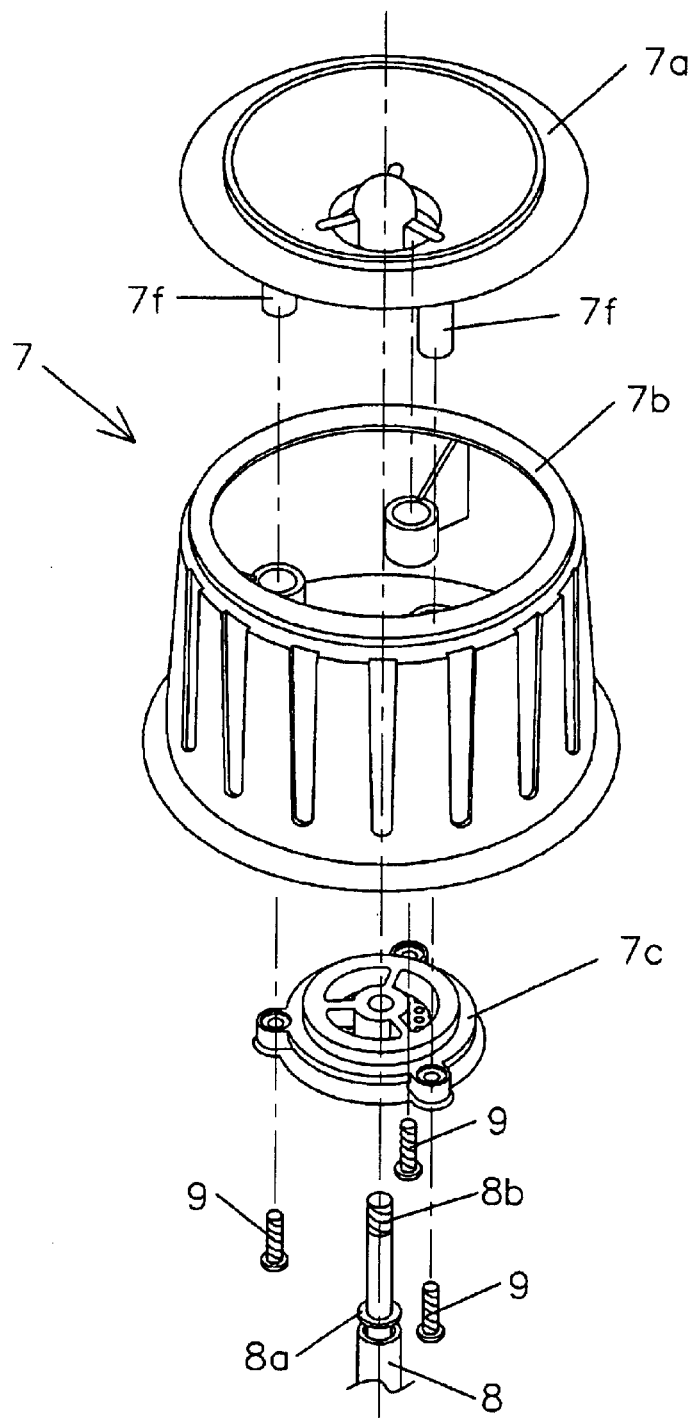
FIG. 13 is an exploded perspective view of a cover according to an embodiment of the present invention.
Figure 14:
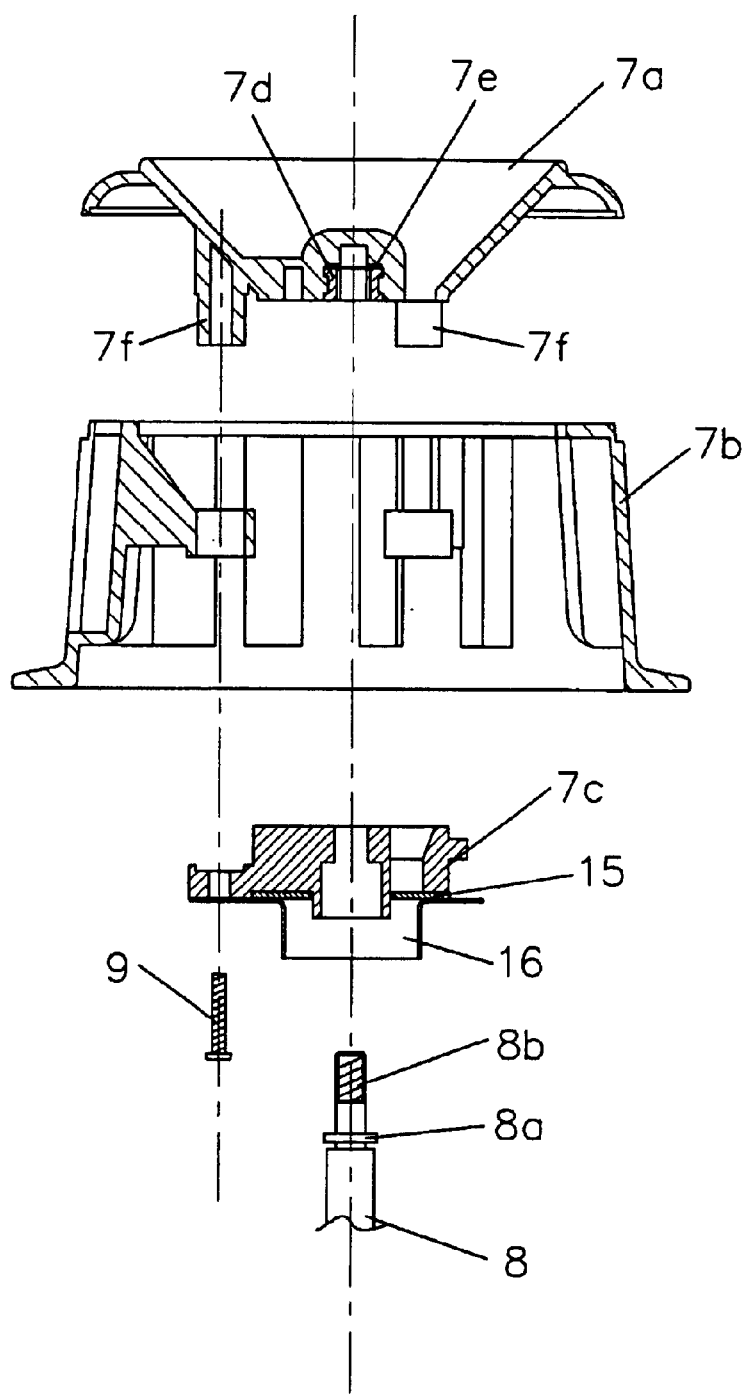
FIG. 14 is an exploded sectional view of the cover according to the embodiment of the present invention.

FIG. 13 is an exploded perspective view of a cover according to the embodiment of the present invention, and FIG. 14 is an exploded sectional view thereof.

In FIG. 13, the cover 7 comprises three members; an upper cover member 7a, a cylindrical cover member 7b and a cover net guide portion 7c.

The upper cover member 7a is formed into the shape of a funnel for introducing sugar to an introduction port, and embedded in a central portion of an upper surface portion of the upper cover member 7a is a nut 7d (refer to FIG. 14) comprising a bushing member 7e (refer to FIG. 14) adapted to be connected to a distal threaded portion 7b of the rotary pot shaft 8.

The cylindrical cover member 7b is formed into a shape which can cover the perimeter of the rotary pot, and blind-like ventilating holes are formed in a side wall portion thereof at regular intervals.

The cover net guide portion 7c prevents foreign matters from entering the interior of the rotary pot from the introduction port and has mounted thereon a metallic cover net 15 for introducing sugar into the rotary pot in a dispersed condition and a guiding metal fixture 16. The cover net guide portion 7c is fixed when a stopper ring 8a of the rotary pot shaft 8 comes into abutment with a stepped portion in a central hole diameter.

In FIG. 14, the cylindrical cover member 7b is assembled in such a manner as to be clamped between the upper cover member 7a and the cover net guide portion 7c and is secured to a screw receiving portion 7f of the upper cover member 7a with a machine screw 9 inserted from the cover net guide portion side. In addition, since the cylindrical cover member 7b is fixed without contacting the rotary pot shaft 8 and the machine screw 9, the cylindrical cover member 7b is made difficult to be affected by heat, and since the upper cover member 7a is slightly heated mainly at a peripheral portion of the central embedded nut 7d, even if the user happens to touch those members while they remain heated by residual heat, there is no concern that the use gets burnt.

Figure 15:
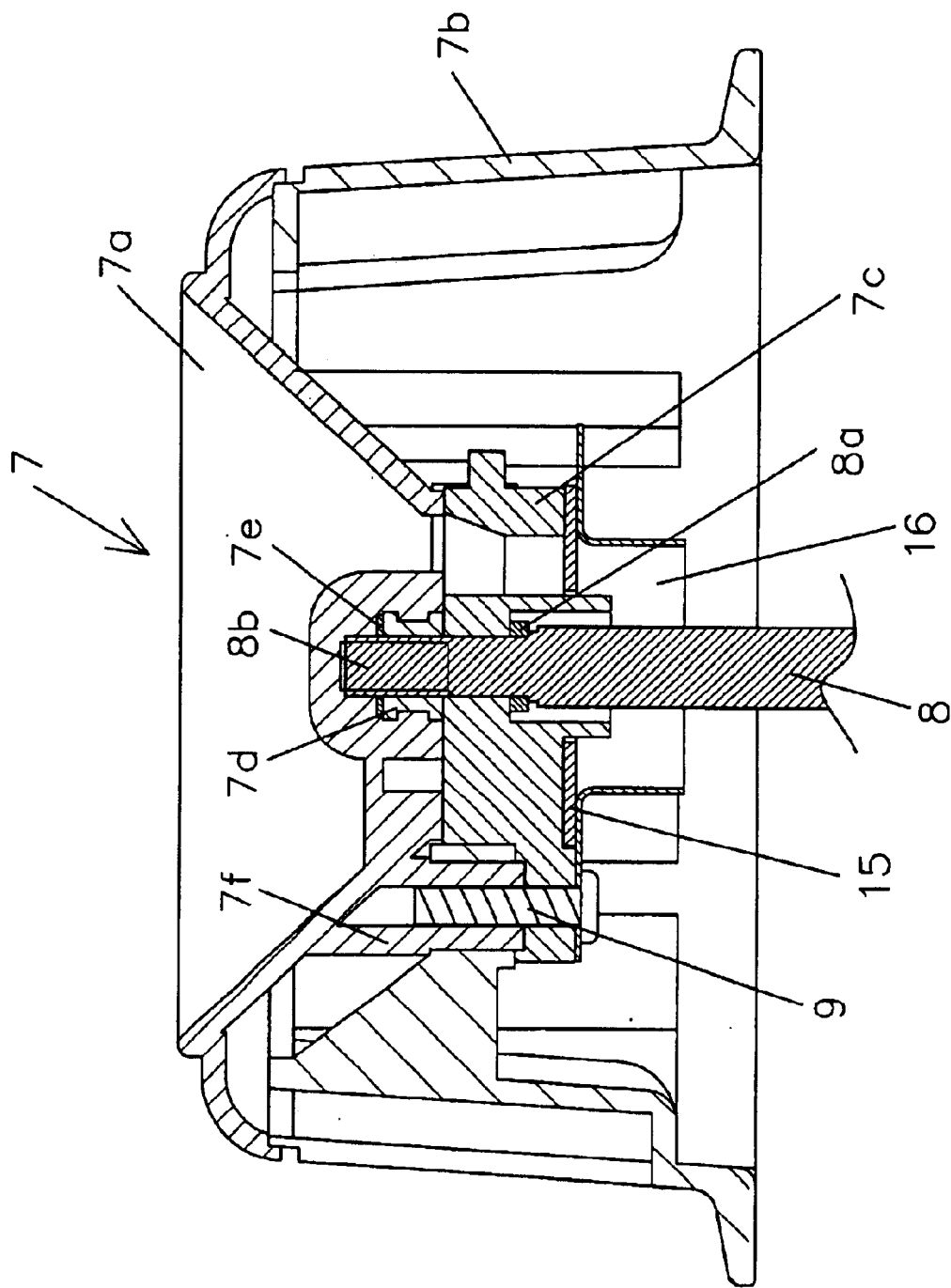
FIG. 15 is a sectional view explaining an attached state of the cover according to the present invention.
Figure 16:
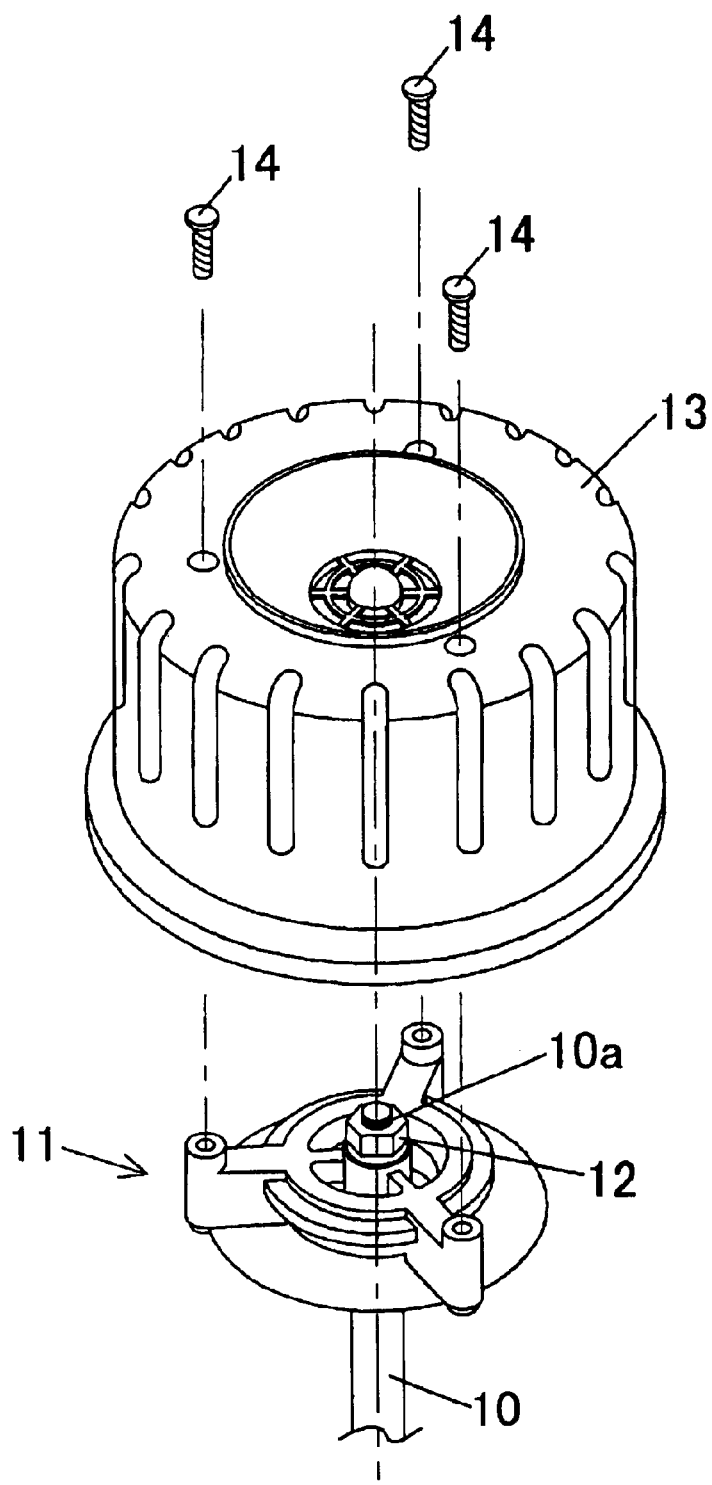
FIG. 16 is an exploded perspective view explaining a conventional cover attaching method.

FIG. 15 is a sectional view showing a state in which the cover 7 according to the present invention is attached to the rotary pot shaft 8, and FIG. 16 is an exploded perspective view showing a conventional cover attaching method.

As shown in FIG. 15, the cover 7 of the rotary pot according to the present invention is secured by connecting the embedded nut 7d of the cover 7 to the distal threaded portion 8b of the rotary pot shaft 8. This allows the cover 7 to be removed easily by rotating the same cover, and a larger force does not have to be applied to the outside diameter of the cover 7. In addition, since the bushing member 7e is disposed at the embedded nut portion 7d, the cover 7 is prevented from being loosened due to vibrations while in a normal use, this allowing the user to play with the apparatus without anxiety.

FIG. 16 shows a conventional example for reference, a cover net guide portion 11 is connected to a distal threaded portion 10a of a rotary pot shaft 10 with a nut 12, and a cover 13 is secured with machine screws 14 to the cover net guide portion 11 so secured, thereby reducing heat transmitted from the rotary pot shaft 10.

Next, the constructions of brush devices for supplying electric current to the heater for the rotary pot and slip rings will be described below.

Firstly, the heating table 19 will be described on which brush devices and slip rings for use in the cotton candy making apparatus according to the present invention are disposed.

Figure 17:
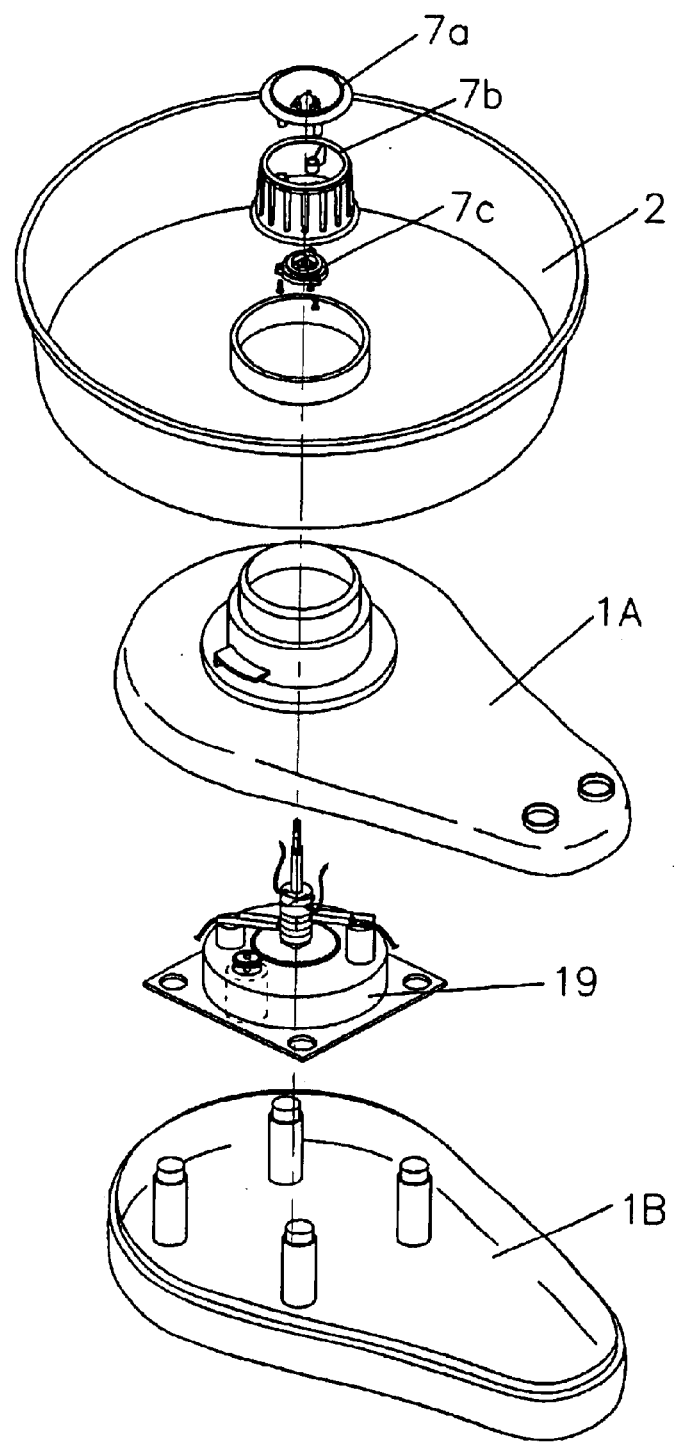
FIG. 17 is a partially exploded view showing a location where a heating table 19 is disposed on which brush devices and slip rings are disposed which are used in the cotton candy making apparatus according to the present invention.

FIG. 17 is a partially exploded view showing a location where the heating table 19 is disposed on which brush devices and slip rings for use in the cotton candy making apparatus according to the present invention are disposed. In this figure, portions which are not referred to while explaining the heating table 19 are omitted as a matter of convenience.

The heating table 19 is disposed in an upper body 1A and a lower body 1B of the main body 1 and is secured to the cover 7 when the stopper ring 8a of the rotary pot shaft 8 on the heating table 19 is brought into abutment with the stepped portion in the central hole diameter of the cover net guide portion 7c of the cover 7 disposed on the tray 2.

Next, referring to FIGS. 18 and 19, the construction of brush devices according to the present invention will be described below.

Figure 18:
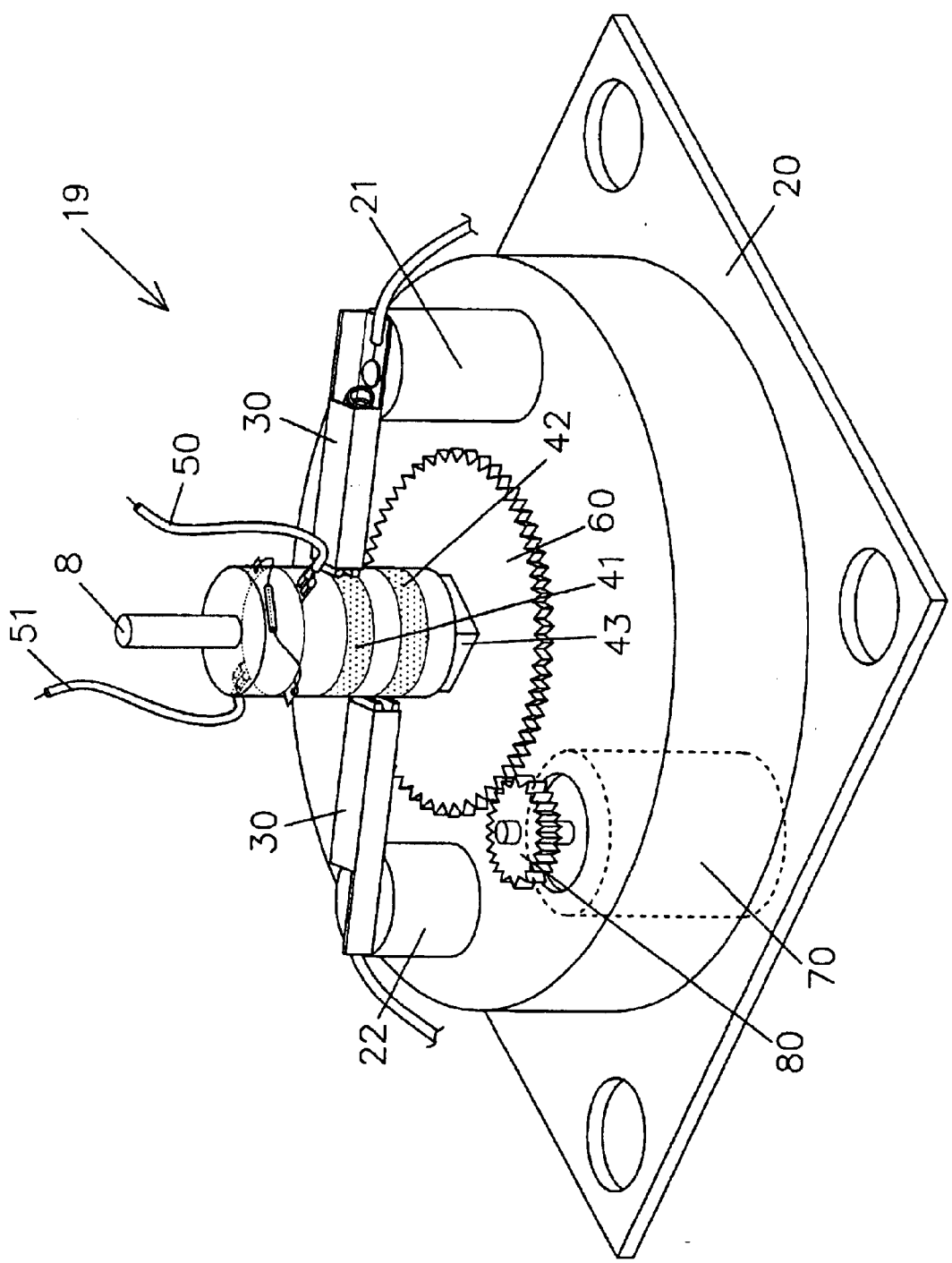
FIG. 18 shows external appearances of a brush portion and a slip ring peripheral edge portion of a heater for a rotary pot for use in the cotton candy making apparatus according to the present invention.

FIG. 18 shows external appearances of peripheral portions of the brush devices and the slip rings for the heater for the rotary pot for use in the cotton candy making apparatus according to the present invention.

Figure 19:
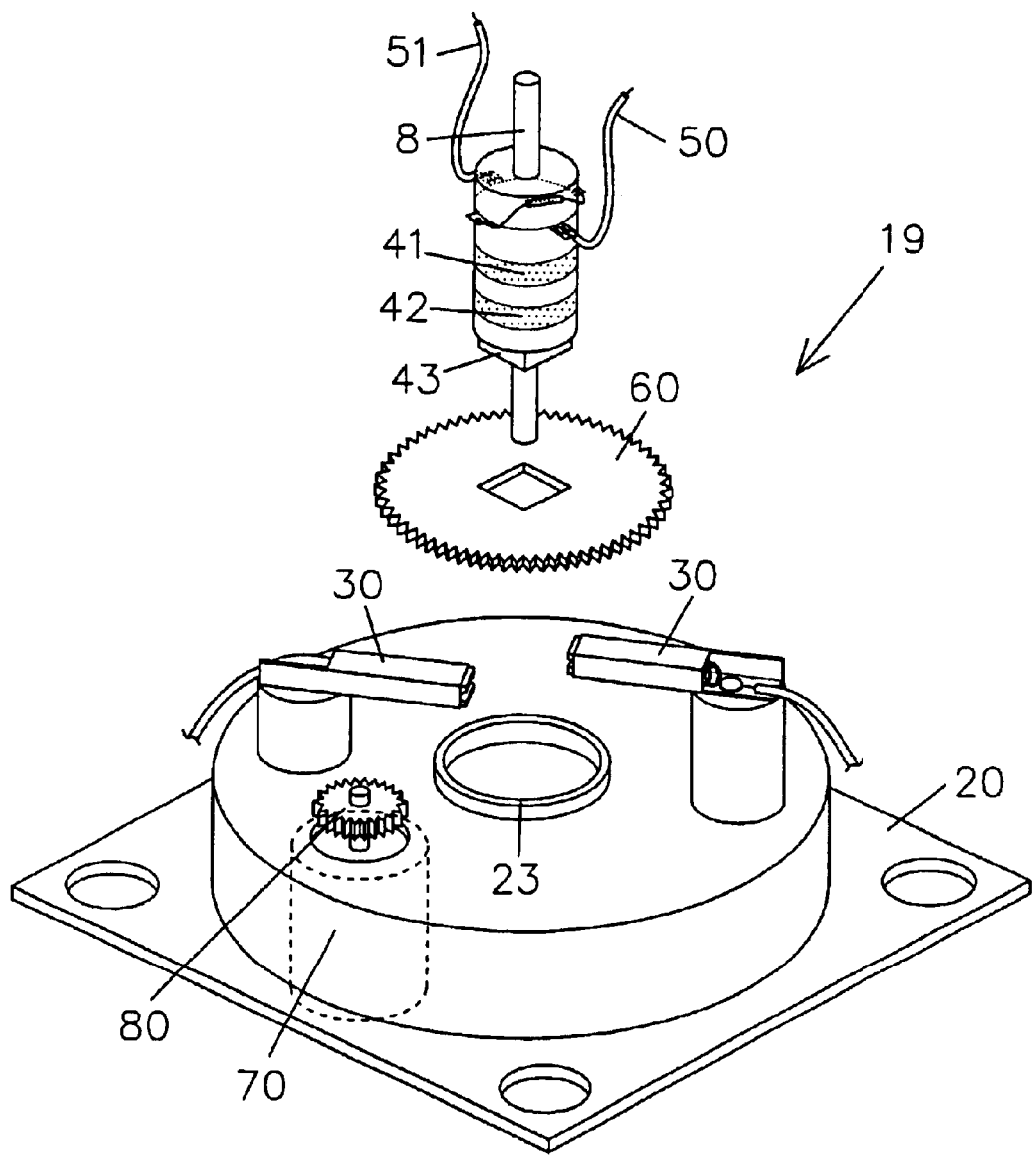
FIG. 19 shows a state in which part of the cotton candy making apparatus is disassembled to describe the constructions of the respective members shown in FIG. 17.

FIG. 19 shows the heating table which is partially exploded in order to explain the constructions of the respective members.

In those figures, the external appearance of the main body of the apparatus and the rotary pot which are not referred to while explaining are omitted as a matter of convenience.

Reference numeral 20 shown denotes a resin attachment portion disposed underneath the heating table. Brush supporting portions 21, 22 are provided on the attachment portion 20, and the brush devices 30 are provided on upper portions of the brush supporting portions 21, 22, respectively. The rotary pot shaft 8 around which the slip rings 41 and 44 are formed is rotatably disposed between the brush devices 30. The slip rings 41 and 42 are made of a metal, and any members situated above and below the slip rings 41 and 42 are formed from a resin having insulating properties.

In addition, the slip ring 41 is connected to an electric conductor 50 and the slip ring 42 to an electric conductor 51. These conductors are connected to the heater.

Additionally, a toothed wheel 60 is provided below the slip rings 41 and 42. This toothed wheel 60 is fitted on a rectangular portion 43 of a resin member provided below the slip ring 42 and is secured thereat. The toothed wheel 60 is in mesh engagement with a pinion 80 fitted on a shaft of a motor 70 provided below the attachment portion 20. In addition, the toothed wheel 60 is situated on a peripheral projection 23 of an opening formed in a central portion of the attachment portion 20 so as to reduce friction generated when it turns.

Next, referring to FIGS. 20 and 21, the construction of the brush devices will be described.

Figure 20:
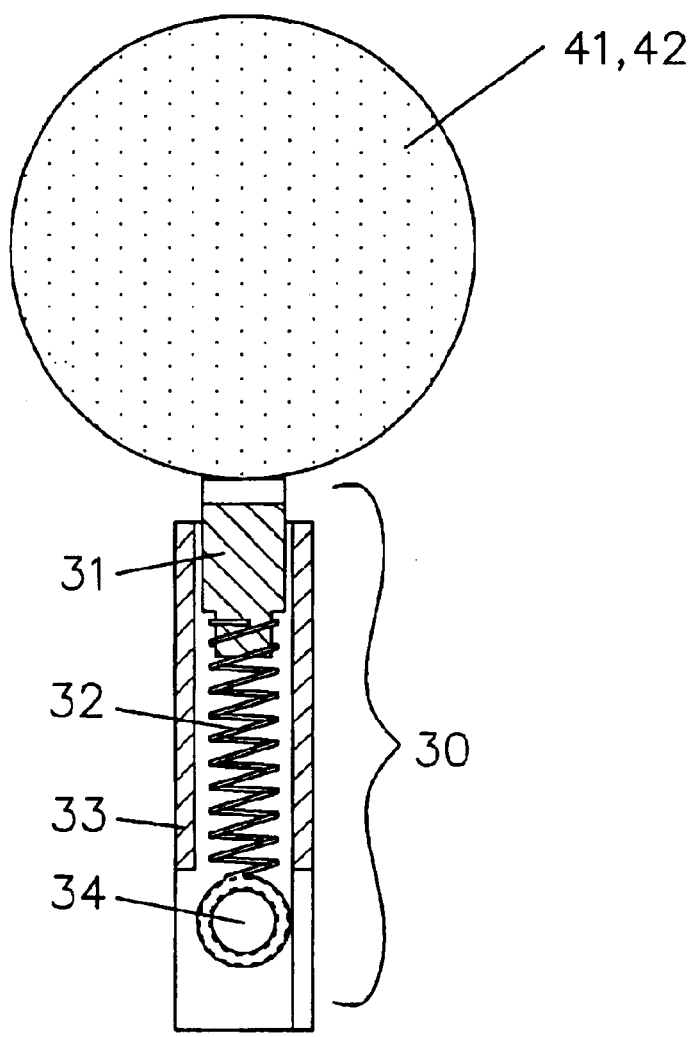
FIG. 20 is an enlarged sectional view showing a construction of the brush device according to the present invention.

FIG. 20 is an enlarged sectional view showing a construction of the brush device according to the present invention.

Figure 21:
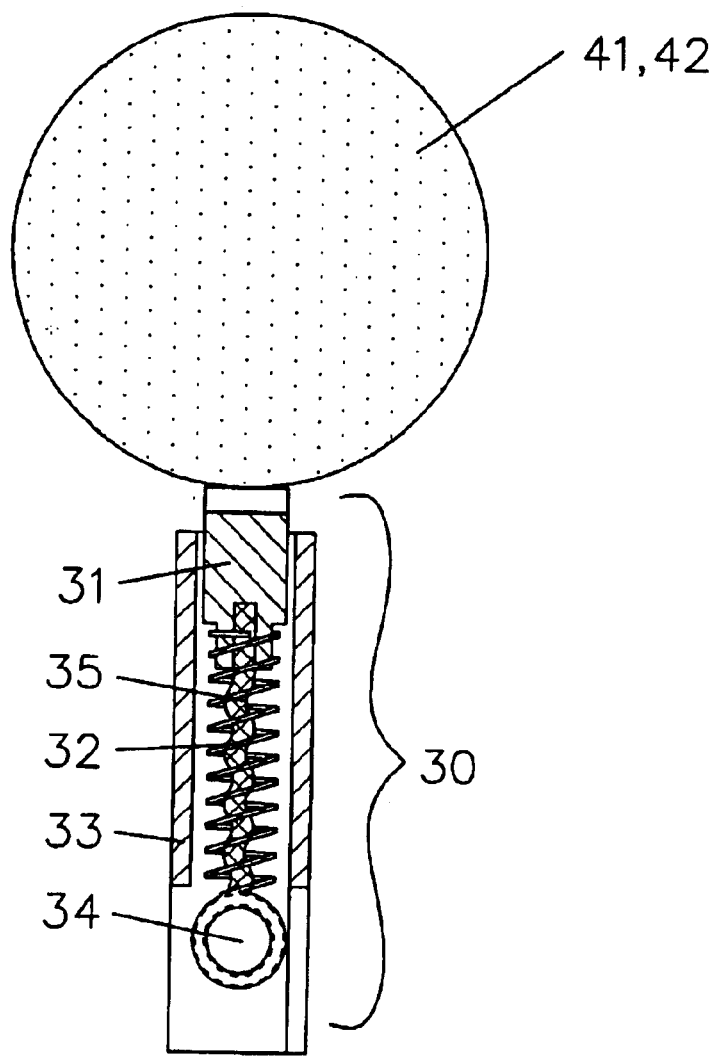
FIG. 21 is an enlarged sectional view showing another construction of the brush device according to the present invention.

FIG. 21 is an enlarged sectional view showing another construction of the brush device according to the present invention.

The brush device 30 comprises a carbon brush 31, a spring 32 and a brush holder 33. A rear end portion of the carbon brush 31 is formed into a thin shaft, and the spring 32 is fittingly attached to the thin shaft portion. The carbon brush 31 on which the spring 32 is fitted is loosely installed in the interior of the brush holder 33, and a hook portion at a rear end of the spring 32 and a hole formed in the rear end portion of the brush holder 33 are secured with a machine screw 34. Note that the hook portion is situated below the machine screw 34, and therefore it is not shown.

According to the construction as described above, since the carbon brush pushed by the spring 32 contacts the slip ring at all times with a suitable pressing force, a spark is made difficult to be generated between the contacts, and therefore the occurrence of abnormal heating of the contact between the brush and the slip ring and wear of the brush and the slip ring can be prevented.

Note that while the spring 32 is used as a conducting body in the construction shown in FIG. 20, in addition to that, as shown in FIG. 21, another construction may be adopted in which a pig tail 35 is connected to the rear of the carbon brush 31, and an end portion of the pig tail 35 is secured with a machine screw 34 together with the hook portion at the rear end of the spring 32.

According to this construction, the electric conductivity is improved when compared with a case where the spring 32 is used as a conducting body, thereby making it possible to reduce the generation of heat.

In addition, on top of the carbon brush described in the aforesaid embodiment, a brush made of an alloy having superior electric conduction properties may be used.

For example, a brush made of a copper alloy can be used.

Figure 22:
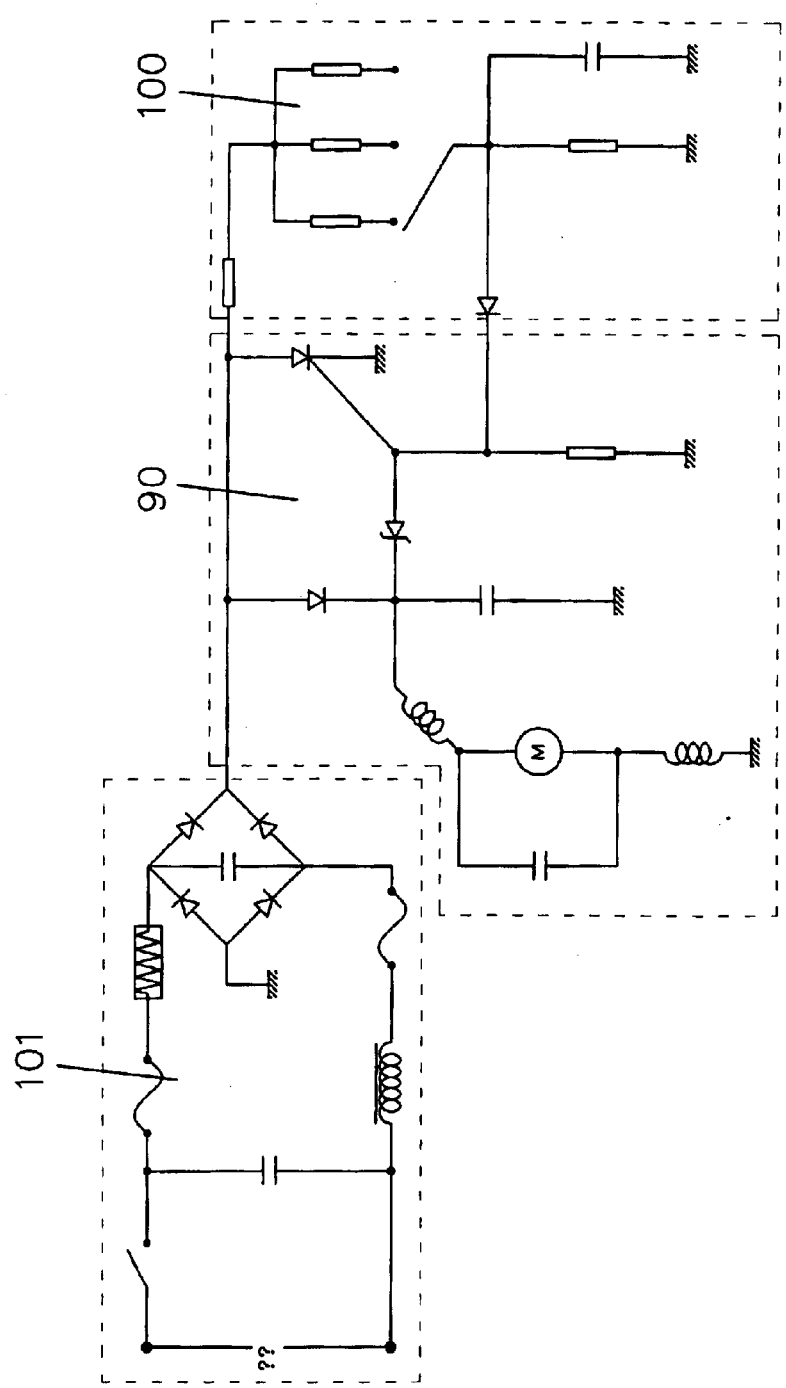
FIG. 22 is a diagram showing the circuit construction of the cotton candy making apparatus according to the present invention.
Figure 23:
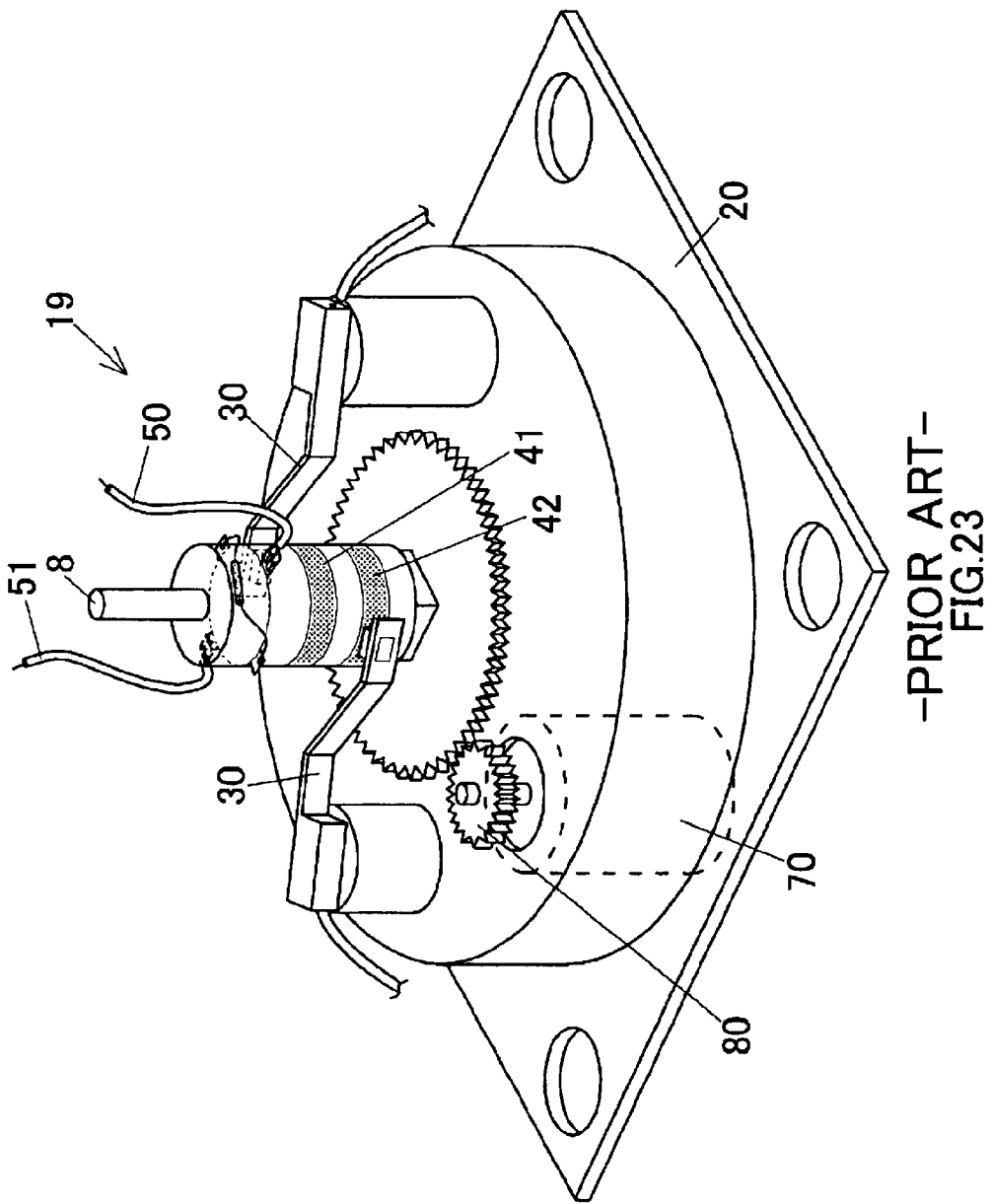
FIG. 23 is a diagram showing the construction of a brush device used in a conventional product.

Next, referring to FIG. 22, the circuit construction of the cotton candy making apparatus according to the present invention will be described below.

Alternating current entering from the plug is sent to the heater via the temperature fuse when the main power supply switch is switched on.

This main power supply switch is constituted by a switch which can perform toggle movement, and the temperature fuse prevents the supply of excessive electric current to the heater in order to keep the temperature of the heater at 130 degrees C. or lower. In addition, a switch circuit 100 is provided in the heater for implementing temperature adjustment. This switch circuit 100 is constituted by a rotary switch which can be switched in three steps, and when this rotary switch is twisted, the circuit is changed over and the resistance value for adjusting the volume of electric current is changed, whereby the volume of electric current that is to be supplied to the heater is changed, the temperature of the heater being thereby adjusted.

Next, electric current is sent to a rectifying and smoothing circuit 101 to be converted into direct current.

This rectifying and smoothing circuit 101 adopts a known circuit which is constituted by a diode, a coil (an inductor) and a capacitor.

Electric current rectified at the rectifying and smoothing circuit 101 is then supplied to a motor driving circuit 90.

Coils are connected in series in this motor driving circuit in order to reduce the level of noise, and capacitors are connected in parallel. When electric current is supplied to a motor driving circuit 90, the motor is driven whereby the pinion gear 80 is driven, and the toothed wheel 60 which is in mesh engagement with the pinion gear 80 turns. In addition, since the toothed wheel 60 is secured coaxially to the shaft to which the rotary pot is connected, in synchronism with the rotation of the toothed wheel 60 the rotary pot turns in interlocking fashion.

According to the construction as described above, the user can properly adjust the temperature of the apparatus suitably according to the conditions of cotton candies made, thereby making it possible to make cotton candies properly.

The present invention is implemented as has been described heretofore and provides the following advantages.

According to the present invention, even in case the guardian switches off the main power supply switch but fails to pull out the plug from the plug socket after the cotton candy making apparatus has been used to make cotton candies and the operating portion of the main power supply switch is hit by a thing or depressed, the contacts are not closed, and therefore the apparatus is activated in no case. In addition, since children of younger ages have difficulty in performing two sequential operations or turning the switch while depressing the operating portion thereof, even if they touch the operating portion of the switch thoughtlessly, there is no risk of the occurrence of an accident involving a serious injury of the user children. Thus, there is provided the safety cotton candy making apparatus.

According to the present invention, even if the main power supply switch is activated mistakenly, power is not supplied to the apparatus unless the tray is properly attached to the main body and the auxiliary switch is properly operated, and therefore there is no risk that the apparatus is activated. Thus, there is provided the safety cotton candy making apparatus which can reduce the risk that an accident or a fire is caused due to wrong usage.

According to the present invention, cotton candies being made within the tray made from the resin having high translucency are allowed to glitter like a jewel by illuminating the cotton candies in the tray with light. Thus, there is provided the cotton candy making apparatus which can provide the advantage that cotton candies being made look tasty.

According to the present invention, the light emitting diodes which illuminate but is not heated at a lower voltage are used for the light emitting portions, and therefore even if the light emitting portions are disposed at the position where children of younger ages can touch them with their hands, the children are safe.

According to the present invention, the light emitting portions are allowed to flash. Thus, by designing the light emitting portions to flash to the predetermined tempo or sounds cotton candies can be made to a certain rhythm, this allowing the user to enjoy making cotton candies further. In addition, by designing the light emitting portions to sequentially flash in the flowing fashion the play of chasing the flashing light can be played while a cotton candy being made is being taken up around a stick. Thus, even boy players can enjoy playing with the cotton candy making apparatus of the invention.

According to the present invention, the cover of the rotary pot of the cotton candy making apparatus can be removed with ease when cleaning is needed. Moreover, since the threaded portion is provided in the cover, no parts such as screws or nuts are needed to attach and secure the cover, and labor hours needed to perform trouble some cleaning can be reduced, whereby no trouble is felt when implementing such cleaning more frequently, and therefore the apparatus can be maintained clean at all times, thereby allowing the guardian to feel safe in letting children play with the cotton candy making apparatus of the invention.

According to the present invention which is constructed as has been described heretofore, there is provided the cotton candy making apparatus in which no spark is generated between the contacts between the brushes and the slip rings which spark would otherwise wear the brushes and the slip rings and heat the contacts therebetween.

What is claimed is:

1. A cotton candy making apparatus comprising a translucent tray that can freely be assembled to and disassembled from a main body, wherein a light emitting portion is provided in said main body of said apparatus for illuminating a cotton candy made in the interior of said tray, said cotton candy making apparatus being characterized in that a main power supply switch adapted to be locked by being rotated in a predetermined direction while being depressed is disposed at an upper portion of said main body.

2. A cotton candy making apparatus as set forth in claim 1, wherein an auxiliary switch mechanism in which contacts are closed by properly attaching said tray to said main body is provided on said main body, whereby power is designed not to be supplied by a main power supply switch unless said contacts of said auxiliary switch mechanism are closed.

3. A cotton candy making apparatus as set forth in claim 1, wherein said light emitting portion is constituted by a plurality of light emitting diodes disposed on a portion of said main body which is situated below said translucent tray attached to said main body.

4. A cotton candy making apparatus as set forth in claim 1, wherein said light emitting portion is adapted to flash.

5. A cotton candy making apparatus as set forth in claim 1, wherein a threaded portion is provided on a cover for said rotary pot which is adapted to be connected to a shaft, whereby said cover can be assembled to and disassembled from said rotary pot by being rotated in predetermined directions.

6. A cotton candy making apparatus as set forth in claim 1, wherein brushes adapted to be biased with springs are employed for brush devices for supplying electric current to a heater of said rotary pot by providing carbon or alloy brushes which are each biased in a slip ring direction with a spring within a brush holder.

* * * * *